(12) United States Patent
McLennan

(10) Patent No.: US 8,930,170 B2
(45) Date of Patent: Jan. 6, 2015

(54) ATTRIBUTE IMPORTANCE MEASURE FOR PARAMETRIC MULTIVARIATE MODELING

(75) Inventor: Jason A. McLennan, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 550 days.

(21) Appl. No.: 12/941,455

(22) Filed: Nov. 8, 2010

(65) Prior Publication Data

US 2011/0119040 A1 May 19, 2011

Related U.S. Application Data

(60) Provisional application No. 61/262,435, filed on Nov. 18, 2009.

(51) Int. Cl.
| G06F 7/60 | (2006.01) |
| G06G 7/48 | (2006.01) |
| G06F 17/18 | (2006.01) |

(52) U.S. Cl.
CPC ............................... *G06F 17/18* (2013.01)
USPC ............................................ 703/2; 703/10

(58) Field of Classification Search
USPC .................................................. 703/2, 10
See application file for complete search history.

(56) References Cited

U.S. PATENT DOCUMENTS

| 5,539,704 | A | 7/1996 | Doyen et al. |
| 5,764,515 | A | 6/1998 | Guerillot et al. |
| 6,549,854 | B1 | 4/2003 | Malinverino et al. |
| 6,662,109 | B2 | 12/2003 | Roggero et al. |
| 6,950,786 | B1 | 9/2005 | Sonneland et al. |
| 7,117,108 | B2 | 10/2006 | Rapp et al. |
| 7,151,845 | B2 * | 12/2006 | Hu ................. 382/109 |
| 7,254,091 | B1 * | 8/2007 | Gunning et al. ........ 367/73 |
| 7,363,163 | B2 | 4/2008 | Le Ra Valec-Dupin et al. |
| 7,392,166 | B2 * | 6/2008 | Le Ravalec-Dupin et al. . 703/10 |
| 7,400,978 | B2 | 7/2008 | Langlais et al. |
| 7,463,027 | B2 | 12/2008 | Prammer et al. |
| 7,577,527 | B2 | 8/2009 | Velasquez |
| 8,700,370 | B2 * | 4/2014 | Landa ..................... 703/10 |
| 2005/0030021 | A1 | 2/2005 | Prammer et al. |
| 2006/0149520 | A1 | 7/2006 | Le Ravalec-Dupin et al. |
| 2007/0005253 | A1 | 1/2007 | Fornel et al. |
| 2007/0055447 | A1 | 3/2007 | Mickaele et al. |
| 2007/0203681 | A1 | 8/2007 | Eyvazzadeh et al. |
| 2008/0133192 | A1 | 6/2008 | Gallagher et al. |
| 2010/0299126 | A1 * | 11/2010 | Chugunov et al. ......... 703/10 |
| 2012/0205963 | A1 * | 8/2012 | Jewbali et al. .......... 299/10 |

OTHER PUBLICATIONS

Ren et al., Quantifying Resources for the Surmont Lease with 2D Mapping and Multivariate Statistics, Apr. 1, 2008, Society of Petroleum Engineers, pp. 341-351.*

(Continued)

*Primary Examiner* — Kamini S Shah
*Assistant Examiner* — Juan Ochoa
(74) *Attorney, Agent, or Firm* — ConocoPhillips Company

(57) ABSTRACT

Parametric Bayesian Updating method is described for attribute importance measures. AIM is a quantitative measure of the relative importance of multiple attributes used in a Bayesian Updating parametric multivariate modeling approach. The AIM is a function of the correlation coefficients between the attributes themselves and the attributes with collocated target variable. The importance calculation is straightforward, repeatable, and objective.

5 Claims, 17 Drawing Sheets

(56) References Cited

OTHER PUBLICATIONS

Feng Pan, Uncertainty sensitivity and geostatistical studies of flow and contaminant transport in heterogeneous unsaturated zone, May 2009, University of Nevada—Las Vegas, PhD dissertation, pp. 1-159.*
Galli et al., Stochastic-aided design and Bayesian updating: New tools to use expert knowledge in quantitative models that incorporate uncertainty, 2004, SPE Annual Technical Conference and Exhibition Proceedings, pp. 2603-2612.*
PCT/US 10/55851 International Search Report and Written Opinion (Form PCT/ISA/220) dated Jan. 7, 2011.
Barr, et al., "Pre-Development Fracture Modeling in the Clair Field, West of Shetland," ed. Lonergan, et al., Fractured Reservoirs, Geological Society of London Special Publication, 270:205-25 (2007).
Barton, et al., "Fluid Flow along Potentially Active Faults in Crystalline Rock," Geology, 23:683-6 (1995).
Bourne & Willemse, "Elastic Stress Control on the Pattern of Tensile Fracturing around a Small Fault Network at Nash Point," UK: J. Struct. Geol. 23:1753-70 (2001).
Deutsch and Zanon, "Direct Prediction of Reservoir Performance with Bayesian Updating under a Multivariate Gaussian Model," Canadian International Petroleum Conference, Paper 047 (2004).
Doyen, et al., "Seismic Porosity Mapping in the Ekofisk Field using a New Form of Collocated Cokriging:," SPE 36498 (1996).
Endres, et al., , Quantitative Fracture Prediction from Seismic Data, Petroleum Geoscience, 14:369-77 (2008).
Ericsson, et al., "Facies and Curvature Controlled 3D Fracture Models in a Cretaceous Carbonate Reservoir, Arabian Gulf," in: Jones, et al. eds., Faulting, Fault Sealing, and Fluid Flow in Hydrocarbon Reservoirs GSL Special Publication, 147:299-312 (1998).
Fischer and Wilkerson, , Predicting the Orientation of Joints from Fold Shape: Results of Pseudo-Three-Dimensional Modeling and Curvature Analysis, Geology, 28:15-8 (2000).
Gale, et al., "Natural Fractures in the Barnett Shale and their Importance for Hydraulic Fracture Treatments," AAPG Bulletin, 91:603-22 (2007).
Haller and Porturas, "How to Characterize Fractures in Reservoirs using Borehole and Core Images; Case Studies," in Harvey and Lovell, eds., Core-Log Integration, GSA Special Publication, 136:249-59 (1998).
Hennings, et al., "Combining Outcrop Data and Three-Dimensional Models to Characterize Fractured Reservoirs: An Example from Wyoming," AAPG Bulletin, 84:830-849 (2000).
Lisle, "Detecting Zones of Abnormal Strains in Structures Using Gaussian Curvature Analysis," AAPG Bulletin, 78:1811-9 (1994).
Lohr, et al., "Prediction of Subseismic Faults and Fractures: Integration of Three Dimensional Retrodeformation and Well Data on an Example of Deformation around an Inverted Fault," AAPG Bulletin, 92:473-485 (2008).
Lynn, et al., "Correlation between P-Wave AVOA and S-Wave Travel Time Anisotropy in a Naturally Fractured Gas Reservoir," The Leading Edge, 15:931-5 (1996).
Mallick, et al., "Determination of the Principal Directions of Azimuthal Anisotropy from P-Wave Seismic Data," Geophysics, 63:692-706 (1998).
Murray, "Quantitative Fracture Study; Sanish Pool, McKenzie County, North Dakota," AAPG Bulletin, 52:57-65 (1968).
Ortiz, "Short Note: Naïve Bayes Classifiers and Permanence of Ratios," CGG Report 4 (2002).
Sanders, et al., "Kinematic Structural Restorations and Discrete Fracture Modeling of a Thrust Trap; a Case Study from the Tarija Basin, Argentina," Mar. Pet. Geo., 21:845-55 (2004).
Schultz-Ela and Yeh, "Predicting Fracture Permeability from Bed Curvature," Proc. 33rd U.S. Symp. Rock Mech., 33:9-89 (1992).
Stearns and Friedman, "Reservoirs in Fractured Rock," in Stratigraphic Oil and Gas Fields: Classification, Exploration Methods, and Case Histories, ed. King, AAPG Memoir, 16:82-106 (1972).
Trappe and Hellmich, "Seismic Volume Attributes for Fracture Analysis," in Fracture and In-Situ Characterization of Hydrocarbon Reservoirs, ed. Ameen, GSL Special Publication, 209:65-75 (2003).
Warpinkski and Lorenz, "Analysis of the Multiwall Experiment Data and Results: Implications for the Basin-Centered Gas Model," in Understanding, Exploring and Developing Tight-Gas Sands, eds. Cumella, et al., AAPG Hedberg Series, 3:157-76 (2008).
Wilkins, 2007, Fracture Intensity from Geomechanical Models: Application to the Blue Forest 3D Survey, Green River Basin, Wyoming, USA: Geological Society, London, Special Publication, v. 292; p. 137-157.
Willis, et al., "Spatial Orientation and Distribution of Reservoir Fractures from Scattered Seismic Energy," Geophysics, 71:O43-51 (2006).
Xu, et al., "Integration Seismic Data in Reservoir Modeling: The Collocated Cokriging Alternative," Soc. Petro. Eng., Paper 24742 (1992).
Decker, et al.., "The use of Remote Sensing, Curvature Analysis, and Coal Petrology as Indicators of Higher Coal Reservoir Permeability" International Coalbed Methane Symposium Proceedings, p. 325-40 (1989).
Gale, "Assessing the Permeability Characteristics of Fractured Rock," in Narasimhan, Recent Trends in Hydrogeology GSA Special Paper 189:163-81 (1982).
Wong and Boerner, "Quantifying Uncertainty for Mapping Fracture Intensity: An Improved Workflow," First Break, 22:41-7 (2004).
Kattenhorn, et al., "Joints at High Angles to Normal Fault Strike: An Explanation using 3-D Numerical Models of Fault-perturbed Stress Fields," J. Struct. Geol., 22:1-23 (2000).
Healy, et al., "Fracture Prediction for the 1980 El Asnam, Algeria Reservoir using Elastic Dislocation Modeling," Tectonics, 23: TC6005 (2004).
Deutsch, et al., "Joint Uncertainty Assessment with a Combined Bayesian Updating/Lu/P-Field Approach," IAMG, 01:639-44 (2005).
Deutsch, "What in the Reservoir is Geostatistics Good for?" JCPT 45:14-20 (2006).
Besag, J., "On the Statistical Analysis of Dirty Pictures," J.R. Statist. Soc. B., 48, p. 259-302, 1986.
Deutsch, C.V. and Journel, A.G.: "GSLIB: Geostatistical software library and user's guide," 2nd edition, Oxford University Press, New York, 1998.
Ren, W., 2007-129 Large Scale Modeling by Bayesian Updating Techniques.

* cited by examiner

FIG. 7
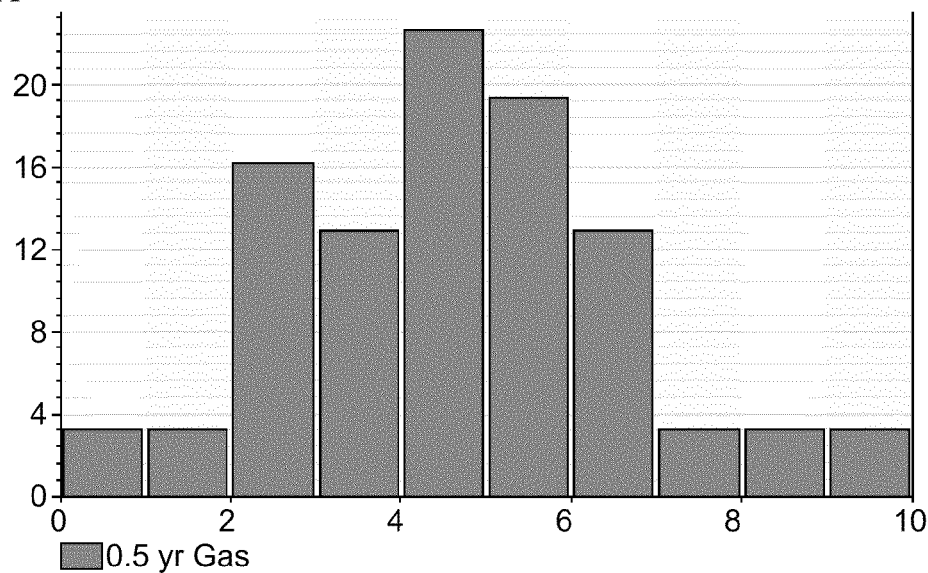
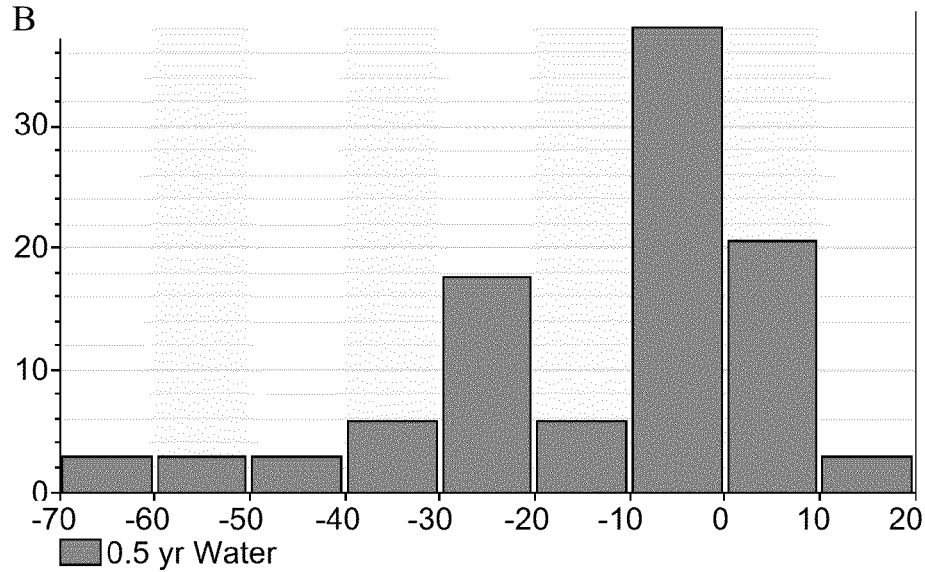

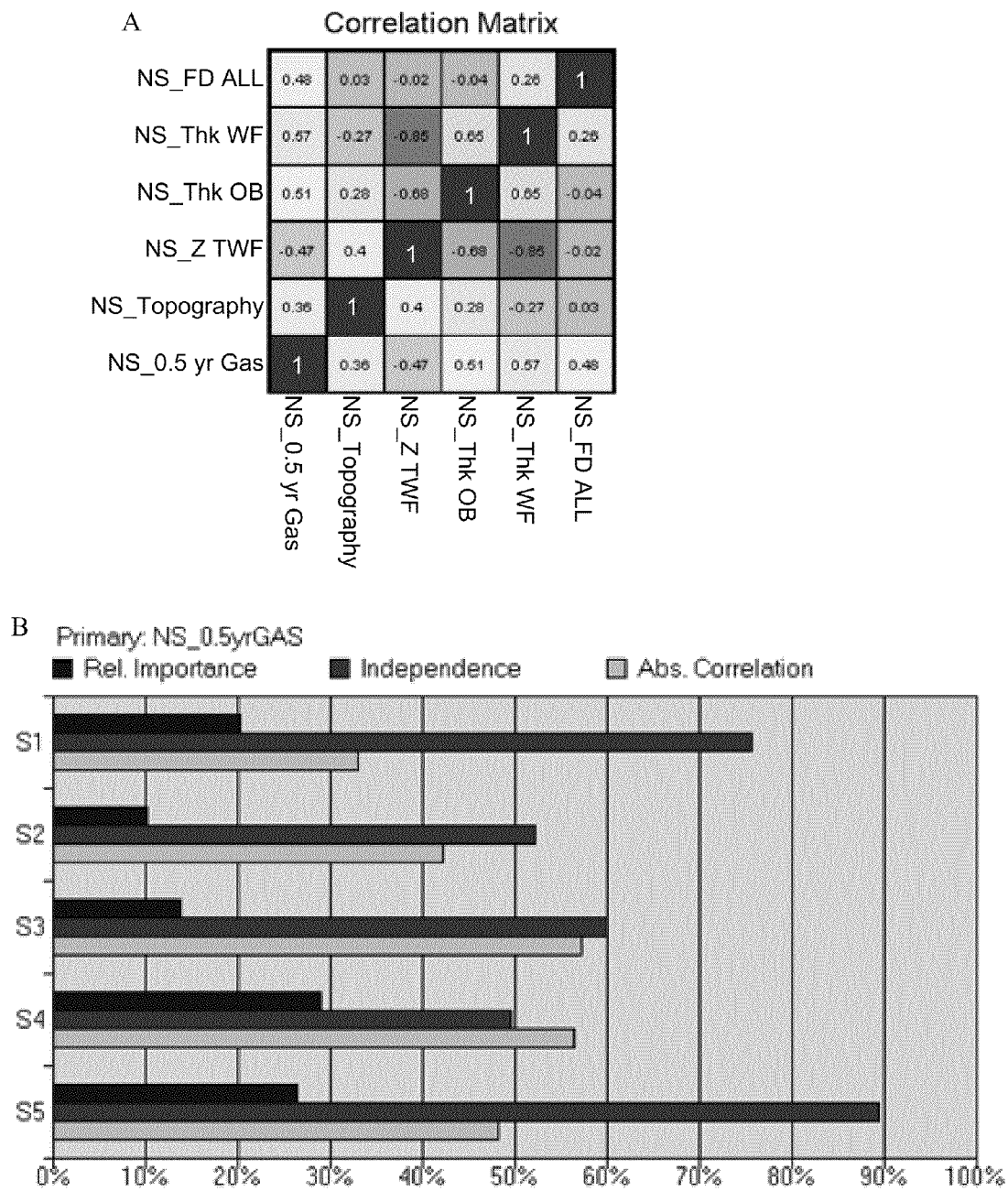

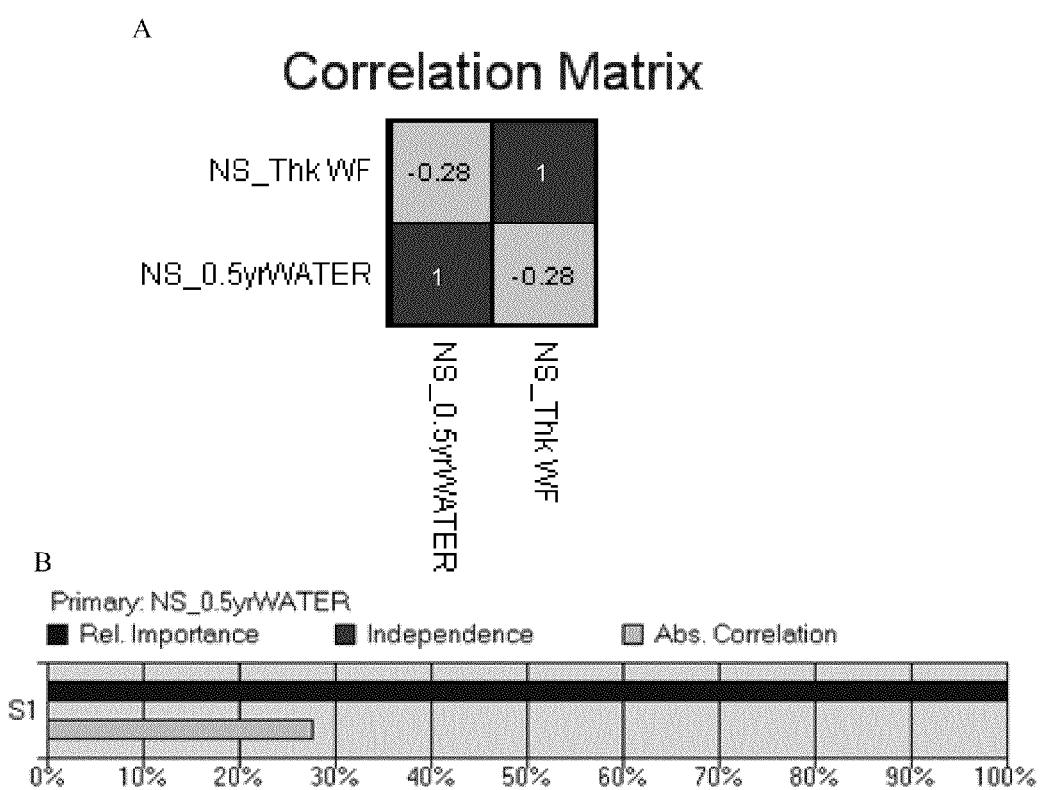
FIG. 9 A & B

FIG. 9 C & D
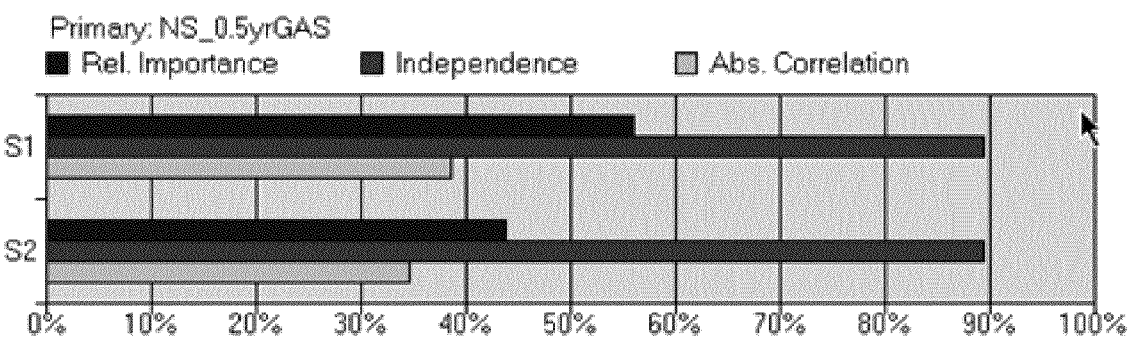

FIG. 10 A & B
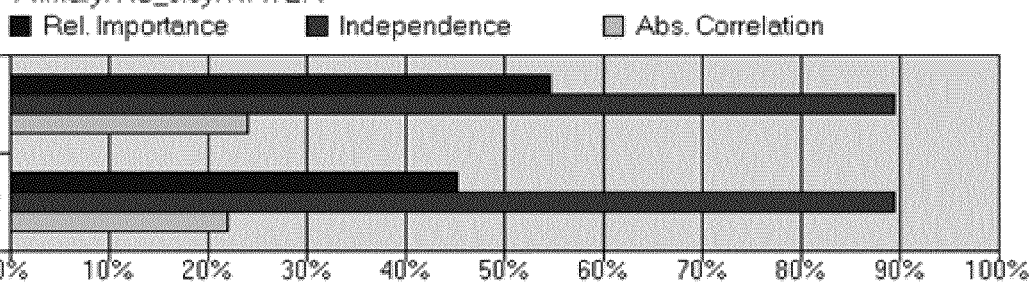

FIG. 10 C & D
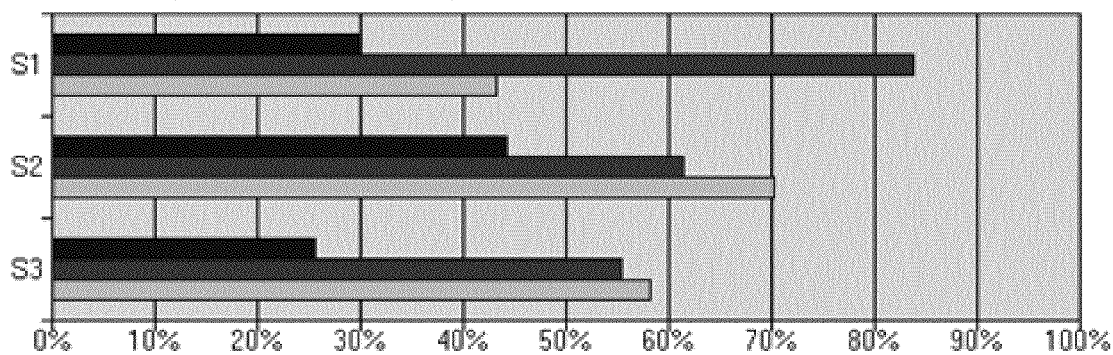

FIG. 12 A

Correlation Matrix

| | NS_0.5yrGAS | NS_Thk OB | NS_MTS TopMWF | NS_DS TopMWF | NS_S22-S11 | NS_S22-S33 | NS_DsiplTotal | NS_Por CWA | NS_SW CWA |
|---|---|---|---|---|---|---|---|---|---|
| NS_SW CWA | -0.5 | -0.06 | -0.29 | 0.13 | -0.16 | -0.13 | -0.02 | -0.53 | 1 |
| NS_Por CWA | 0.41 | 0.3 | 0.39 | -0.14 | 0.27 | 0.15 | 0.26 | 1 | -0.53 |
| NS_DsiplTotal | 0.43 | 0.01 | -0.2 | -0.13 | -0.1 | -0.22 | 1 | 0.26 | -0.02 |
| NS_S22-S33 | 0.58 | 0.58 | 0.21 | 0.15 | 0.67 | 1 | -0.22 | 0.15 | -0.13 |
| NS_S22-S11 | 0.7 | 0.27 | 0.1 | -0.01 | 1 | 0.67 | -0.1 | 0.27 | -0.16 |
| NS_DS TopMWF | -0.35 | -0.01 | -0.11 | 1 | -0.01 | 0.15 | -0.13 | -0.14 | 0.13 |
| NS_MTS TopMWF | 0.39 | 0.3 | 1 | -0.11 | 0.1 | 0.21 | -0.2 | 0.39 | -0.29 |
| NS_Thk OB | 0.51 | 1 | 0.3 | -0.01 | 0.27 | 0.58 | 0.01 | 0.3 | -0.06 |
| NS_0.5yrGAS | 1 | 0.51 | 0.39 | -0.35 | 0.7 | 0.58 | 0.43 | 0.41 | -0.5 |

ATTRIBUTE IMPORTANCE MEASURE FOR PARAMETRIC MULTIVARIATE MODELING

PRIOR RELATED APPLICATIONS

This application is a non-provisional application which claims benefit under 35 USC §119(e) to U.S. Provisional Application Ser. No. 61/262,435 filed Nov. 18, 2009, entitled "Attribute Importance Measure for Parametric Multivariate Modeling," which is incorporated herein in its entirety.

FIELD OF THE DISCLOSURE

The present disclosure generally relates to methods and apparatus for calculating an attribute importance measure from a parametric multivariate modeling algorithm called Bayesian Updating. This parametric multivariate model yields probabilistic predictions of a target variable based on the correlation between collocated measurements of the target variable and multiple potentially predictive attributes. The importance measure is a quantitative metric showing how influential each attribute will be during prediction, but can be calculated before actually implementing the prediction step. This prior understanding about the value of different types of information is useful for focusing resources and planning future data acquisition programs towards the most valuable types of information.

BACKGROUND OF THE DISCLOSURE

Subsurface geological modeling involves predicting target variables of interest for development planning and production forecasting. Target variables are directly measured at locations where the subsurface has been penetrated by wells through which various tools are run to take measurements. The subsurface model at the sample locations is conditioned by these sample measurements with no attached uncertainty. Between well locations, however, predictions of target variables with attached measures of uncertainty are required.

To reduce prediction uncertainty, a wide variety of subsurface attributes ranging in scope, scale, and quality can be considered as predictive proxies of the target variable where direct measurements do not exist. Categories and examples of attributes might include geometric (formation thickness, formation depth, fault distance, fracture intensity), kinematic (strain, curvature), mechanical (Young's Modulus, Poisson's Ratio, brittleness), geomechanical (stress, dilation), petrophysical (porosity, permeability), sedimentary (facies proportion), or geophysical (acoustic impedance, p-wave/s-wave velocity). By recognizing that more than one attribute is correlated to and influences the target variable outcomes, predictions of target variables should take into account more than one correlated attribute.

Techniques to solve this multivariate prediction problem generally fall into two categories: Non-parametric and parametric. Non-parametric tools use a subset of the target and attribute data to train complex non-linear relationships that are then applied for predicting the target variable at unsampled locations over the area of interest. Neural networks and variations thereof have become popular for this purpose. Bishop (1995) reviews the fundamentals of setting up and implementing neural networks. Non-parametric techniques are successful in modeling complex multivariate relationships and deriving an optimum combination of the attributes that maximizes the correlation to the target variable. However, the attribute-variable combinations constructed throughout the evolution of the training phase are difficult to control, understand and rationalize with geological interpretation, and merge with prior target variable measurements.

More recently, parametric techniques are being developed and implemented for multivariate prediction. These techniques are generally referred to by the theorem most draw on, Bayesian Updating. Bayesian Updating was first used by Doyen and Den Boer (U.S. Pat. No. 5,539,704) and Doyen et al., 1996. Attributes are combined and merged with prior target variable measurements according to a stationary multivariate Gaussian random function model assumption (Journel and Huijbregts, 1978) and Baye's Law. The result is a posterior Gaussian distribution for the target variable at each prediction location. Unlike for neural network techniques, the attribute-variable combinations are embedded within an objective and understandable mathematical model definition. The most significant challenge with Bayesian Updating is attaining a satisfactory fit to the model parameters in situations with relatively numerous direct target variable measurements.

Guerillot & Roggero (U.S. Pat. No. 5,764,515) use Bayesian inversion with production data to update the geological model of the reservoir. In U.S. Pat. No. 6,950,786, Sonneland and Gehrmann describe a Bayesian and Contextual Bayesian classification method that assigns vectors to a class based on the Gaussian distribution of the classes. Roggero and Mezghani (U.S. Pat. No. 6,662,109, US2003028325) use Bayesian inversion, as a probability density function that predicts observations, accuracy of parameters, and variation in the model. Mickaele and Hu use a pilot point method (U.S. Pat. No. 7,363,163; US2007055447) with kriging to eliminate the need for inversion of the covariance matrix. In U.S. Pat. No. 7,400,978, Mikaele and associates use a gradual deformation technique to model a geological formation over changes in time. Al-Waheed and associates (US2007203681) use a Monte Carlo numerical analysis to account for uncertainties.

Neither a non-parametric or parametric multivariate modeling technique will completely remove the inherent uncertainty in predicting a target variable between measurement locations. Both techniques will however provide means to quantify and manage this uncertainty. For neural network techniques, quantifying uncertainty in predictions is a somewhat non-unique exercise, but is still possible (Wong and Boerner, 2004). For Bayesian Updating the uncertainty is embedded in the posterior Gaussian distribution of the target variable.

As correlated attributes are added, both non-parametric and parametric techniques generally offer increments of diminishing uncertainty. It is the attributes with the highest correlation to the target variable that potentially drive the largest increments towards reducing prediction uncertainty. For neural network applications, the most important attributes are derived from the relative attribute weighting assigned during the training phase (Wong and Boerner, 2004). However, the weighting and resulting relative attribute importance is non-unique since the combination of attributes during training is non-unique.

Unfortunately, as described by Roggero and associates (U.S. Pat. No. 7,392,166) the Bayesian approach is extremely time-consuming forcing them to instead use Gaussian punctual pseudo-data reducing the accuracy of the results. An unbiased model is required that determines with the lowest possible uncertainty a target variable of interest at any location in the model. For practical applications, this must be done in a straightforward theoretically consistent manner. Bayesian Updating (BU) is a statistical theory relating conditional probabilities; the technique underlies all conventional geostatistical algorithms and can be used to achieve multivariate data integration. Its practical application to the geosciences, however, presents a number of challenges.

BRIEF DESCRIPTION OF THE DISCLOSURE

This invention provides the first quantitative attribute importance measure (AIM) for attributes being combined within the Bayesian Updating parametric multivariate modeling approach. Compared to importance measures derived from non-parametric approaches, an objective AIM is derived through an analytical function of multivariate correlation coefficient model parameters. The calculated AIM is more useful for assessing the value of information since the calculation can be performed before actually implementing Baye's Law for predicting the posterior Gaussian distribution of the target variable. Because attribute importance within the parametric Bayesian Updating technique is an analytical function of the attribute-to-attribute and attribute-to-target correlation coefficient model parameters, the parametric importance measure also does not require prediction to have been implemented since it is derived from pre-determined model parameters; in comparison, neural networks need to be trained in order to derive attribute importance. Parametric Bayesian Updating attribute importance measures have never been developed and documented to date.

A method is provided for quantifying the relative importance of multiple attributes used in a Bayesian Updating parametric multivariate modeling approach. The AIM is a function of the correlation coefficients between the attributes themselves and the attributes with collocated target variable. The importance calculation is straightforward, repeatable, and objective.

A method measuring attribute importance in a subsurface formation comprising: making a multivariate Gaussian assumption with a normal score transformation (a); executing a simple kriging to estimate a prior mean ($y_{SK}$) and variance ($\delta_{SK}^2$); calculating a matrix of correlation coefficients from all collocated combinations of normal scored event pairs; executing a simple kriging with the calculated model of multivariate correlation to estimate a likelihood mean ($y_L$) and variance ($\delta_L^2$); calculating an updated Gaussian Probability Distribution Function (PDF) by combining the prior and likelihood estimates according to the Gaussian normal score transformation (a); and transforming the updated Gaussian PDF N($y_U$, $\delta_U^2$) back to real units using the normal score transformation (a).

A method for determining relevant attributes in a subsurface formation comprising: making a multivariate Gaussian assumption with a normal score transformation; executing a simple kriging to estimate a prior mean ($y_{SK}$) and variance ($\delta_{SK}^2$); calculating a matrix of correlation coefficients from all collocated combinations of normal scored event pairs; executing a simple kriging with the calculated model of multivariate correlation to estimate a likelihood mean ($y_L$) and variance ($\delta_L^2$); calculating an updated Gaussian Probability Distribution Function (PDF) by combining the prior and likelihood estimates according to the Gaussian normal score transformation (a); transforming the updated Gaussian PDF N($y_U$, $\delta_U^2$) back to real units using the normal score transformation (a); obtaining formation measurements for attributes with an attribute importance (I) over p50.

A method for updating a Probability Distribution Function for a subsurface formation comprising: making a multivariate Gaussian assumption with a normal score transformation; executing a simple kriging to estimate a prior mean ($y_{SK}$) and variance ($\delta_{SK}^2$); calculating a matrix of correlation coefficients from all collocated combinations of normal scored event pairs; executing a simple kriging with the calculated model of multivariate correlation to estimate a likelihood mean ($y_L$) and variance ($\delta_L^2$); calculating an updated Gaussian Probability Distribution Function (PDF) by combining the prior and likelihood estimates according to the Gaussian normal score transformation (a); and transforming the updated Gaussian PDF N($y_U$, $\delta_U^2$) back to real units using the normal score transformation (a).

The main utility of the present invention is a ranking of attributes according to how influential they are in reducing the uncertainty and narrowing the range of values within the local posterior distributions of the target variable. This can be calculated prior to performing prediction so that the value of different types of information can be evaluated. One can then retain a smaller subset of the full attribute list and maintain virtually all the predictive influence of all the attributes. In one embodiment, uncertainty reduction proportion thresholds are set that reduce the number of variables required. For example, in many cases, to achieve 90% of the total uncertainty reduction, less than five attributes would be needed versus an initial potential list of hundreds. The smaller set of the most important attributes would reduce the prediction implementation time and resources as well as elevate the types of variables that control a target variable's spatial heterogeneity behavior. This relative importance evaluation can be merged with the cost of generating the attributes to guide the collection and acquisition of data and to help improve subsurface development decisions.

TABLE 1

Abbreviations

| Abbreviation | |
| --- | --- |
| AIM | Attribute Importance Measure (AIM) |
| CAPEX | Capital expenditure |
| FSI | Fracture Spacing Intensity |
| NTG | Net-To-Gross |
| PDF | Probability Distribution Function |

BRIEF DESCRIPTION OF THE DRAWINGS

Guerillot & Roggero (U.S. Pat. No. 5764515) use Bayesian inversion with production data to update the geological model of the reservoir. In U.S. Pat. No. 6950786, Sonneland and Gehrmann describe a Bayesian and Contextual Bayesian classification method that assigns vectors to a class based on the Gaussian distribution of the classes. Roggero and Mezghani (U.S. Pat. No. 6662109, US2003028325,) use Bayesian inversion, as a probability density function that predicts observations, accuracy of parameters, and variation in the model. Mickaele and Hu use a pilot point method (U.S. Pat. No. 7363163; US2007055447) with kriging to eliminate the need for inversion of the covariance matrix. In U.S. Pat. No. 7400978, Mikaele and associates use a gradual deformation technique to model a geological formation over changes in time. Al-Waheed and associates (US20070203681) use a Monte Carlo numerical analysis to account for uncertainties.

FIG. 7(A): Histogram of the 182-day cumulative gas production primary variable. Each bar represents gas production variable values falling within a particular range. The y axis values represent percentage frequency. The x axis values represent the cumulative gas production at 182 days, where the gas production has been divided by the difference between the square of a well's initial pressure and the square of its average flowing well pressure over 182 days (units are scf/psi2).

FIG. 7(B): Histogram of the 182-day cumulative water production primary variable. Each bar represents water production variable values falling within a particular range. The y axis values represent percentage frequency. The x values represent the cumulative water production at 182 days. In order to account for completion fluid, the cumulative water production at 182 days has been reduced by subtracting the volume of the load fluid injected. This water production value has then been divided by the difference between the square of a well's initial pressure and the square of its average flowing well pressure over 182 days (units are bbls/psi2).

FIG. 8: Correlation matrix (A) and importance summary (B) for the geometric attributes (S1=Topography; S2=Z TWF; S3=Thk OB; S4=Thk WF; S5=FD ALL) calibrated to gas production.

FIG. 9: Correlation matrix (A) and importance summary (B) for the geometric attributes (S1=Thk WF) calibrated to water production. Correlation matrix (C) and importance summary (D) for the FEM geomechanical attributes (S1=MTS TopMWF; S2=DS TopMWF) calibrated to gas production.

FIG. 10: Correlation matrix (A) and importance summary (B) for the ED geomechanical attributes (S1=MTS TopMWF; S2=DS TopMWF) calibrated to water production. Correlation matrix (C) and importance summary (D) for the ED geomechanical attributes (S1 DisplTotal; S2=S22-S11; S3=S22-S11) calibrated to gas production.

DETAILED DESCRIPTION OF EMBODIMENTS OF THE INVENTION

Figure 1:
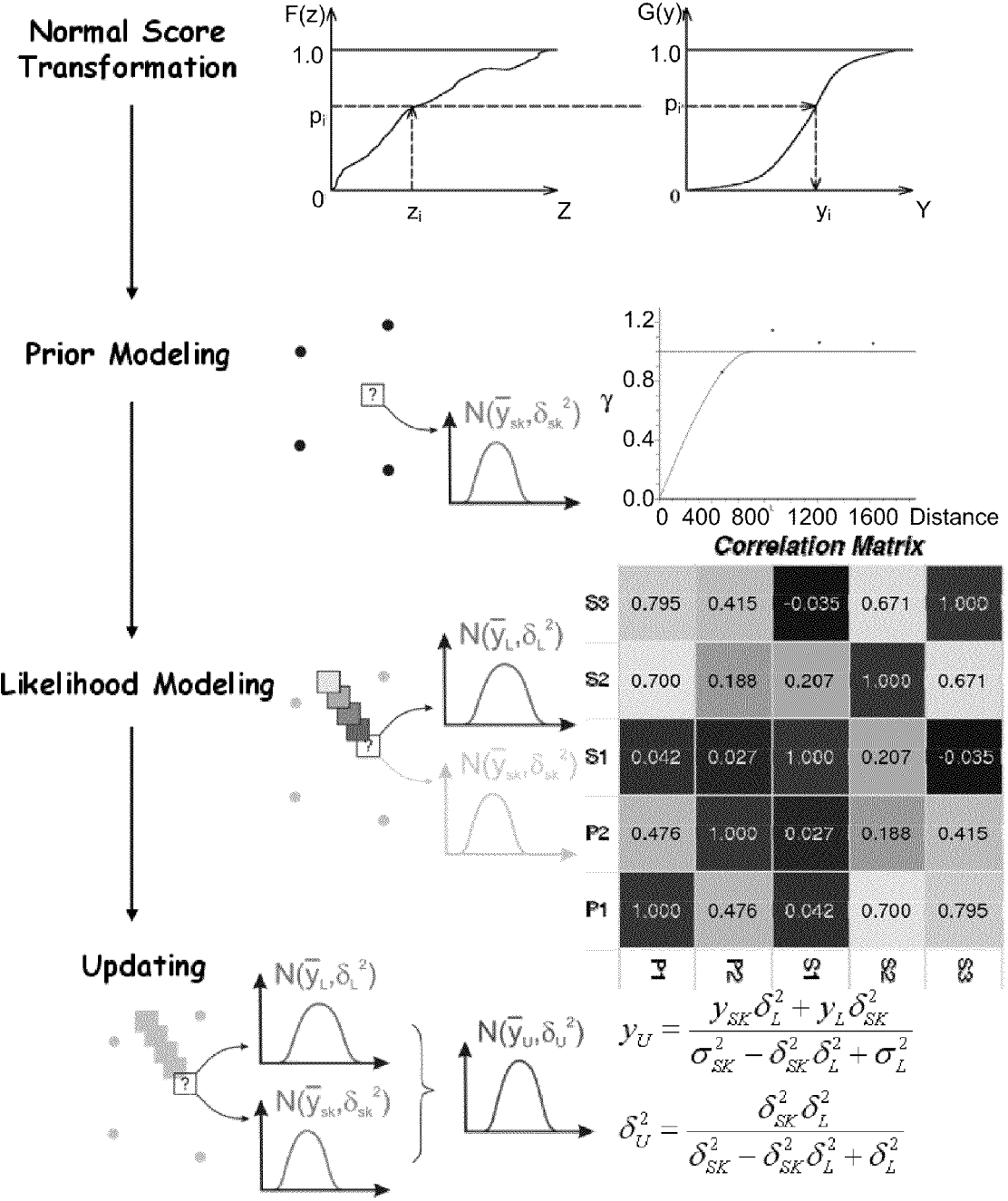
FIG. 1: Bayesian Updating procedure. From top to bottom: 1) Quantile-to-quantile normal score transformation from real units to normal score units; 2) Simple kriging to the prior event; 3) PDF using a variogram model with simple kriging for the likelihood event and PDF using a matrix of multivariate correlation coefficients; and 4) Updating of the event and prior PDF with the likelihood PDF.

Consider in the bottom of FIG. 1 the prediction of an event A at the unknown location (?). For predicting event A, there are four scattered A measurements (circles) unavailable at the unknown (?) location as well as a set of N attributes or events $B_1, B_2, \ldots, B_N$ available at both the unknown (?) location (squares) and all the other remaining locations throughout the gridded domain. Event A may represent any target variable of interest while events $B_1, B_2, \ldots, B_N$ are attributes that correlate to and help predict A.

Assume the event A probability and the event $B_1, B_2, \ldots, B_N$ probabilities are each parameterized with PDFs that are Gaussian with a mean and variance of zero and one. We then determine the posterior PDF of event A given the $B_1, B_2, \ldots, B_N$ event PDFs. In quantifying this conditional probability, there are many potential schemes that can be adopted to combine the prior event A PDF and event $B_1, B_2, \ldots, B_N$ PDFs. Bayesian Updating is one such scheme with its own unique assumptions around the independence of the A and $B_1, B_2, \ldots, B_N$ probabilities.

In general, at the prediction location (?), Bayesian Updating merges a prior Gaussian PDF with a likelihood Gaussian PDF into an updated Gaussian PDF. The prior model is the event A PDF independent of the $B_1, B_2, \ldots, B_N$ events (squares) and is inferred from a model of spatial correlation derived just from surrounding event A measurements (black circles). The prior blue PDF in FIG. 1 is normally distributed with mean and variance $y_{SK}$ and $\delta_{SK}^2$, respectively, or $N(y_{SK}, \delta_{SK}^2)$. The SK notation indicates the simple kriging algorithm for calculating $y_{SK}$ and $\delta_{SK}^2$, the simple kriging estimate and variance. The likelihood model is the event A PDF conditionally independent of the event A and is inferred from the multivariate correlation matrix calculated from all collocated combinations of A (shaded circles), $B_1, B_2, \ldots, B_N$ (shaded squares) pairs. The likelihood PDF, green in FIG. 1, is normally distributed with mean and variance $y_L$ and $\delta_L^2$, respectively, or $N(Y_L, \delta_L^2)$. The updated PDF, red in FIG. 1, is normally distributed as $N(y_U, \delta_U^2)$ where the $y_U$ mean and $\delta_U^2$ variance are combinations of the prior and likelihood Gaussian PDF parameters:

$$y_U = \frac{y_{SK}\delta_L^2 + y_L\delta_{SK}^2}{\delta_{SK}^2 - \delta_{SK}^2\delta_L^2 + \delta_L^2} \quad (1)$$

$$\delta_U^2 = \frac{\delta_{SK}^2\delta_L^2}{\delta_{SK}^2 - \delta_{SK}^2\delta_L^2 + \delta_L^2}$$

In one embodiment, the implementation and application of Bayesian Updating involves six key steps (see illustrations in FIG. 1):

1. A multivariate Gaussian assumption is made. The event A PDF and each event $B_1, B_2, \ldots, B_N$ PDF needs to follow a Gaussian distribution. A normal score transformation is implemented to achieve this and the transform table is stored for the back transform;

2. Simple kriging is executed on event A normal score values (shaded circles) with a model of spatial correlation or variogram. The simple kriging estimate and variance is the prior mean and variance $y_{SK}$, and $\delta_{SK}^2$;
3. A matrix of correlation coefficients is calculated from all collocated combinations of normal scored A, $B_1$, $B_2$, ..., $B_N$ event pairs;
4. Simple kriging is repeated as in Step 2 except the model of spatial correlation is replaced with the calculated model of multivariate correlation. Here the simple kriging estimate and variance is the likelihood mean and variance $y_L$, and $\delta_L^2$;
5. The updated Gaussian PDF $N(y_U, \delta_U^2)$ is calculated by combining the prior and likelihood PDFs according to relation (1);
6. The updated Gaussian PDF $N(y_U, \delta_U^2)$ is transformed back to real units using the transformation tables stored in Step 1.

The updated primary model accounts for the spatial correlation of event A as well as the multivariate relationships between all A, $B_1$, $B_2$, ..., $B_N$ event combinations. By incorporating a quantitative evaluation attribute importance the values are properly weighted and analyzed, preventing correlated attributes from being over-weighted and identifying attributes that contribute either alone or in conjuction with other attributes to the property A being investigated.

The value of multivariate modeling is an improvement in prediction that can be measured according to how much the uncertainty or variance has decreased from the prior PDF (before correlated attributes are integrated) to the updated posterior PDF (after correlated attributes are integrated), that is, the magnitude of change in PDF ($\Delta\delta^2=\delta_{SK}^2-\delta_U^2$) is the direct measure of improvement. The correlated attributes B, $B_n$, n=1, ... N, each contribute towards the total uncertainty reduction an amount $I_n \cdot \Delta\delta^2$ where I, $I_n$, n=1, ... N, is the proportion of total uncertainty reduction each individual attribute is responsible for. It is this measure I that is referred to as attribute importance. Through the parametric multivariate Gaussian random function model assumption, attribute importance I is the following function of correlation coefficients (generated in step 3 above) and the simple kriging weights (calculated in step 4 above).

$$I_n = \frac{\lambda_n \cdot \rho_n}{\sum_{n=1}^{N} \lambda_n \cdot \rho_n}, n = 1, ... N \quad (2)$$

where $\lambda_n$ is the simple kriging weight given to attribute n and $\rho_n$ is the correlation coefficient between attribute n and the target variable. Another representation could be substituting the normal equations for $\lambda_n$ which would show that I is also a function of the redundancy correlations between attributes. Therefore, a more intuitive interpretation of attribute importance is that it is a balance between the attribute ($B_n$) to target (A) closeness correlation and the n attribute ($B_n$) to N attribute ($B_n$, n=1, ... N) redundancy correlations. This ensures that the attribute with the highest correlation with the target variable and lowest correlation with other attributes is identified as being the most important. Similar or redundant attributes will be filtered out as being less important since this lowers the $\lambda_n$ kriging weight.

The matrix of correlation coefficients can be built at every location within the area of interest by assigning weights to the collocated data pairs used within the correlation coefficient calculation. Data pairs closer to the location where the correlation matrix is being built will receive more weight towards the correlation coefficient for this location. The simple kriging equations can be solved at each location. And then the importance measure can be calculated at each location to quantify and visualize the spatial extent of any attribute's importance and influence on subsequent prediction. A particular attribute may be important in one region, but unimportant over the remaining area of interest.

A vital benefit of this importance formulation and calculation is that it can be calculated before implementing the prediction step in 5 above. This provides a means for evaluating the value of particular types of information within the current area of interest and any other areas of interest to which the present area of interest may be an analogue. If during development and data acquisition planning, this information is available, a team can focus CAPEX on only the most important types of attribute information. This can also be done for any areas where the present area is an appropriate analog. In this case, development and acquisition decisions can be made without having to spend any CAPEX on target variable measurements. The first example is an outcrop example that is an appropriate analog for low NTG tight gas reservoirs. The importance ranking calculated for this example could then be used to guide development and data acquisition planning at other low NTG tight gas reservoirs without having to collect target variable measurements.

Another important benefit is that it improves the Bayesian Updating workflow and numerical calculation efficiency. Out of potentially hundreds of attributes, often only a handful of attributes is responsible for most of the total uncertainty reduction. This smaller set of the most important attributes reduces the time required to solve the normal equations and perform prediction. Carrying hundreds of attributes through all the Bayesian Updating steps is unnecessarily time consuming and does not incrementally improve prediction performance.

The importance results also require a reasonable amount of interrogation into the cause and effect relationship suggested by the underlying correlation coefficients. This is in fact an important part of the methodology and enhances a team's understanding about the multivariate structure driving the target variable's spatial heterogeneity.

The following examples of certain embodiments of the invention are given. Each example is provided by way of explanation of the invention, one of many embodiments of the invention, and the following examples should not be read to limit, or define, the scope of the invention.

EXAMPLE 1

Oil Mountain Anticline

Figure 2:
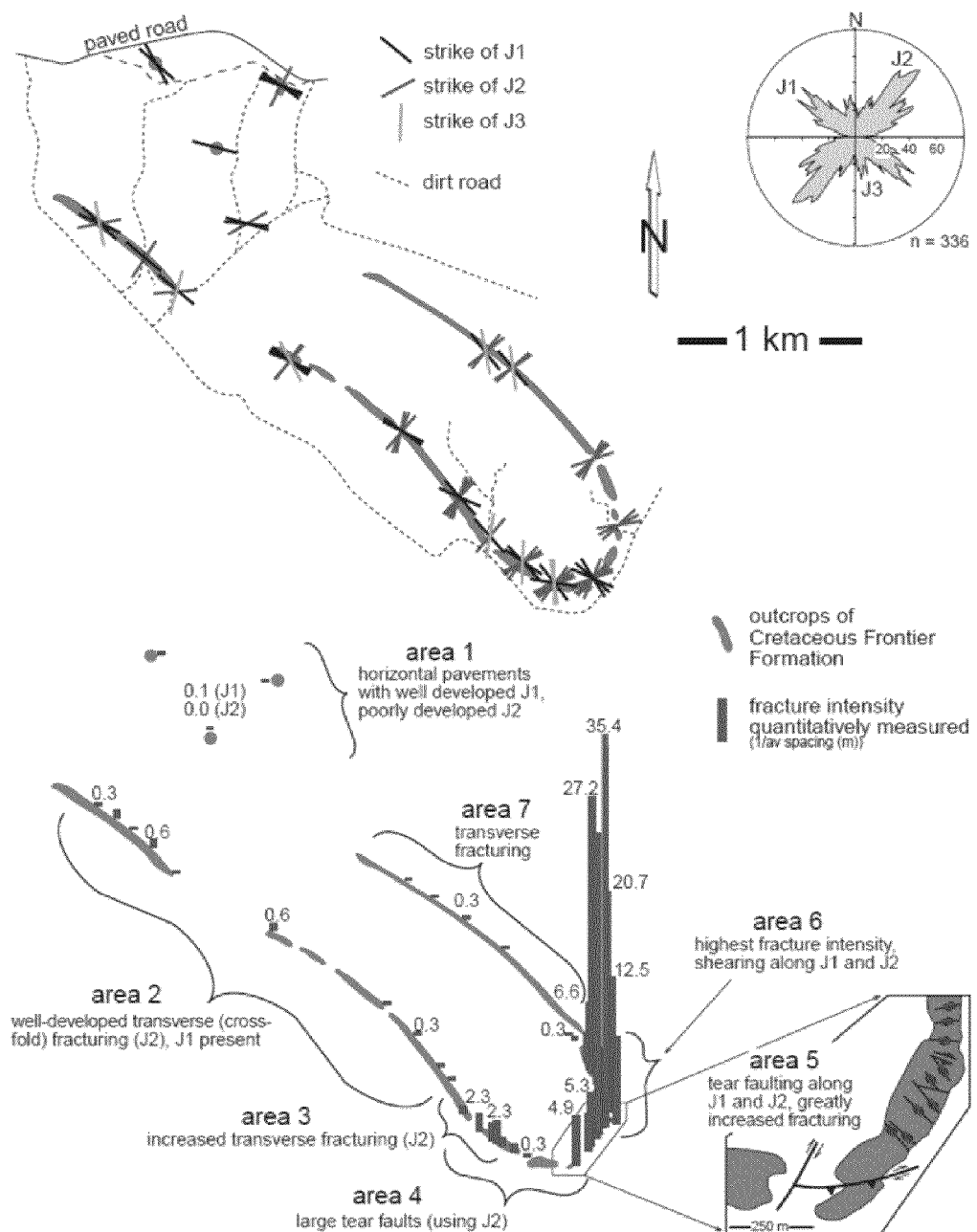
FIG. 2: Fracture characterization in the Frontier Formation sandstone performed by Hennings et al (2000). Top left: average strike of fractures belonging to sets J1, J2, and J3 with local bedding rotated to horizontal. Top right: rose diagram showing the strike of all fractures measured. Bottom: FSI magnitude for J2. The height of the bars represents the intensity of fracturing.

Oil Mountain Anticline is a northwest trending fold of Laramide age exposed on the southwest flank of Casper Arch in central Wyoming (Cserna et al., 1983). The Cretaceous Frontier Formation forms continuous outcrops flanking the anticline. The Frontier Formation can be considered an analog for low net-to-gross tight gas subsurface reservoirs. A fracture geometry characterization, a suite of correlated geometric and kinematic attributes, and an assessment of attribute-intensity correlation is already available for this formation (Hennings et al., 2000). The fracture characterization consists of a series of FSI measurements where the Frontier Formation outcrops along the backlimb, forelimb, and plunging southeastern nose of the anticline, FIG. 2. The fractures are grouped into three sets: J1, J2, and J3. J1 is a regional set of southeast striking fractures that formed mainly prior to folding. J2 and J3 fractures are northeast and north striking, respectively, and hypothesized to have formed during folding. The intensity of J1 is observed to be relatively constant over the fold while the intensity of J2 and J3 vary greatly according to structural position. J2 fractures occur in far greater abundance than J3 fractures and are therefore the focus of our current application.

The goal is predicting FSI of the J2 set within the Frontier Formation beyond the FSI outcrop measurements. Strain and curvature attributes are used in the Bayesian Updating. The strain attribute is a kinematic measure of the deformation imparted during the process of folding suggesting higher fracture intensity in the plunging nose region and the curvature attribute is a geometric measure suggesting higher fracture intensity along the fold hinge, FIG. 3.

Figure 3:
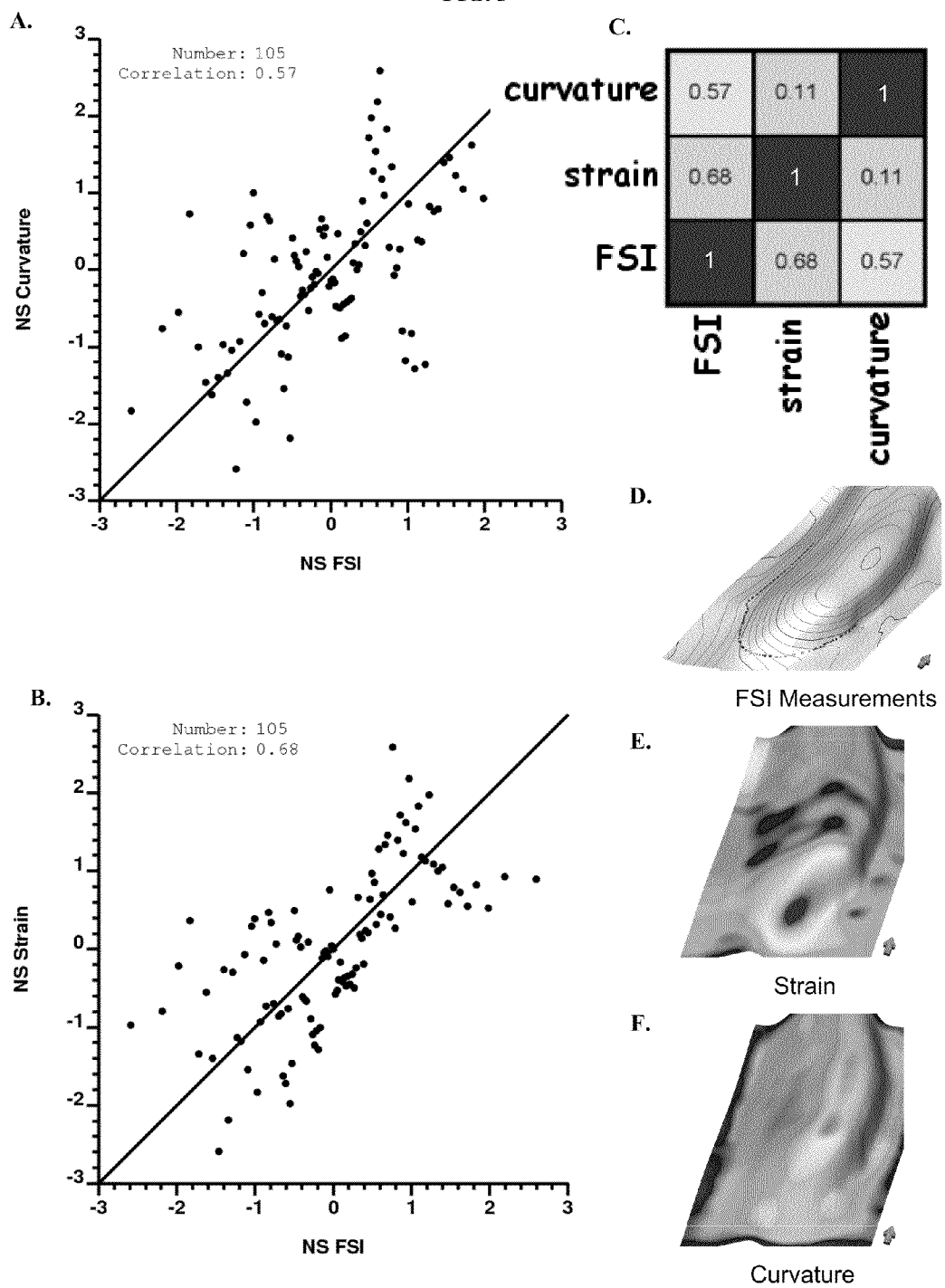
FIG. 3: FSI outcrop measurements at 105 J2 (top right). The strain and curvature are shown in the bottom left and right, respectively. A normal score color bar from −2.5 (dark) to +2.5 (light) is used. The 105 pair FSI-strain and FSI-curvature cross plots and correlations are shown in the top and middle left, respectively. The full correlation matrix is also shown in the middle.

FIG. 3 shows 105 J2 FSI measurement locations available along the Frontier Formation outcrop (top right) with the strain and curvature variables used for the updating (bottom left and right, respectively). The FSI, strain, and curvature variables are all transformed to normal scores and rendered in FIG. 3 between −2.5 (blue) to +2.5 (red). Notice the elevated level of strain along the southern plunging nose of the anticline and elevated curvature along the crest of the anticline. The FSI-strain and FSI-curvature cross plots and correlations are also shown in the top and middle left of FIG. 3; the correlations of strain and curvature to FSI are 0.68 and 0.57, respectively. From the full 3×3 correlation matrix, the strain-curvature correlation is 0.11.

Neither strain nor curvature alone, predicts FSI without significant uncertainty. This is evident by their less than perfect correlation to the available FSI measurements, 0.68 for strain and 0.57 for curvature. Moreover, using the strain attribute alone would underestimate FSI along the hinge where we would expect the higher folding strains to result in higher FSI; likewise, using curvature alone would underestimate FSI on the plunging nose where we would expect elevated 3D strain to result in higher FSI. In our example case, it is better to use both strain and curvature.

Figure 4:
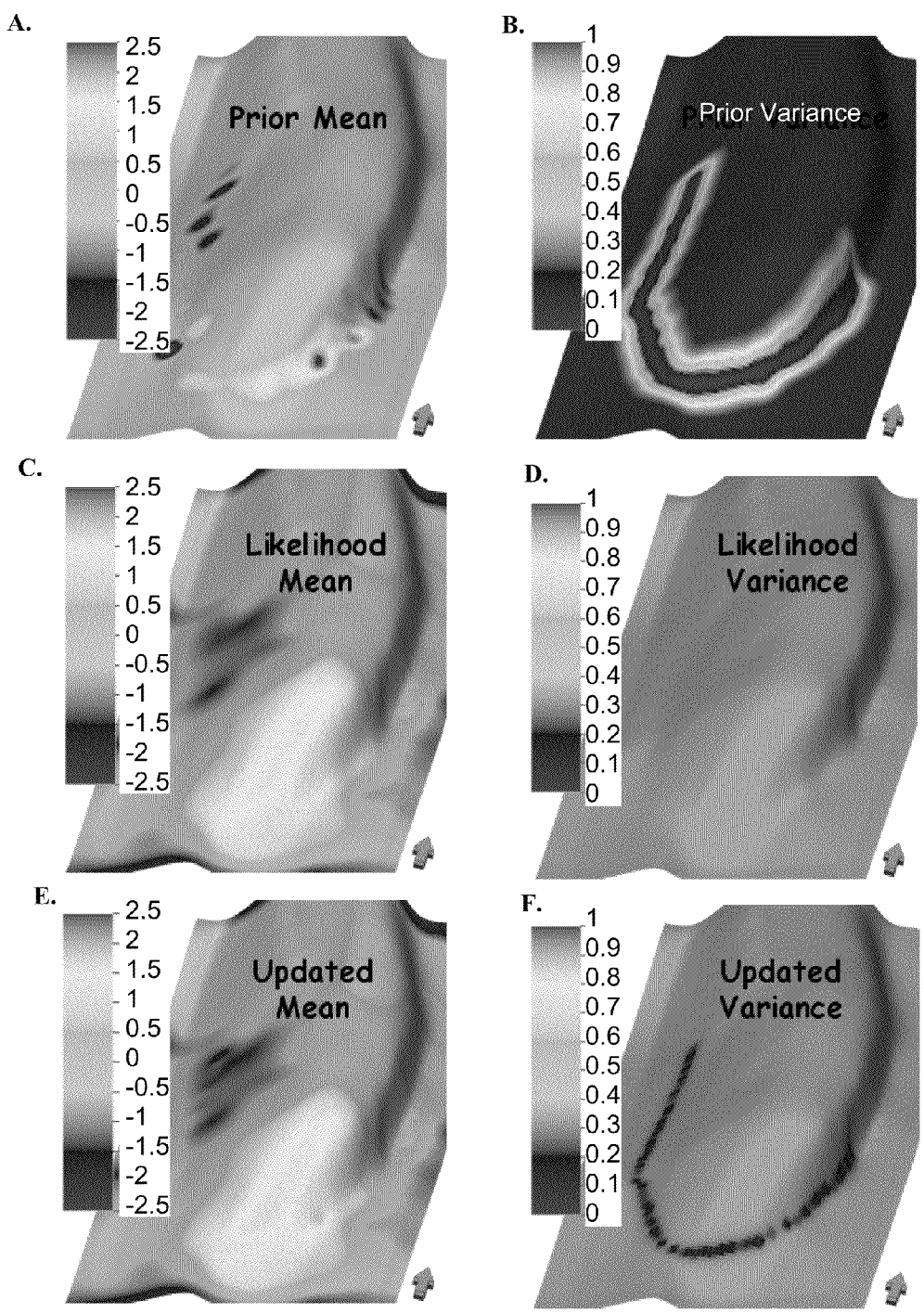
FIG. 4: The prior (top), likelihood (middle), and updated (bottom) FSI PDFs are shown. A normal score color bar from −2.5 (dark) to +2.5 (light) is used for the PDF means and a color bar from 0 (dark) to 1 (light) is used for the PDF variances.

FIG. 4 shows the prior (top), likelihood (middle), and updated (bottom) FSI PDF mean (left) and variance (right) parameters. Notice the prior variance is a maximum of 1.0 beyond the 150 m range of spatial correlation used for the variogram in simple kriging. The likelihood shows how the strain and curvature attributes combine according to the multivariate correlation matrix. Notice the higher values on the plunging nose and the along the crest due to the combined strain and curvature attributes. The updated mean does not change within 150 m of the FSI outcrop measurements and takes on the likelihood mean beyond the 150 m range. Similarly, the updated variance is close to the kriging variance near the FSI outcrop measurements and takes on the likelihood variance beyond the 150 m range.

Figure 5:
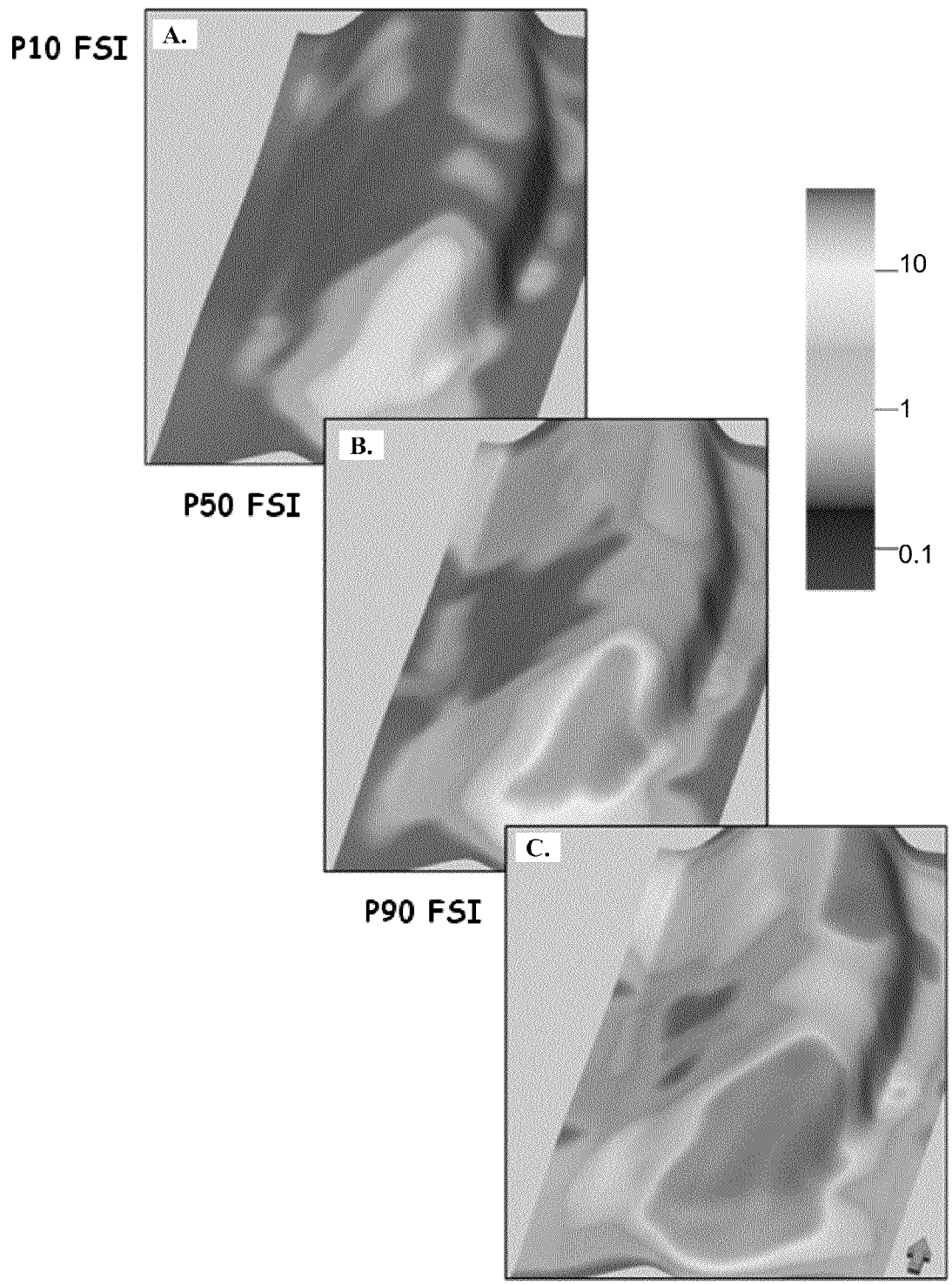
FIG. 5: The back transformation of the updated FSI PDFs to p10 (top), p50 (middle), and p90 (bottom) probabilistic models in real units.

FIG. 5 shows the probabilistic low p10 (top), medium p50 (middle), and high p90 (bottom) results. These maps can be used to quantify and convey the range of fracture intensity for geological risking and forecasting within any region of the model.

Figure 6:
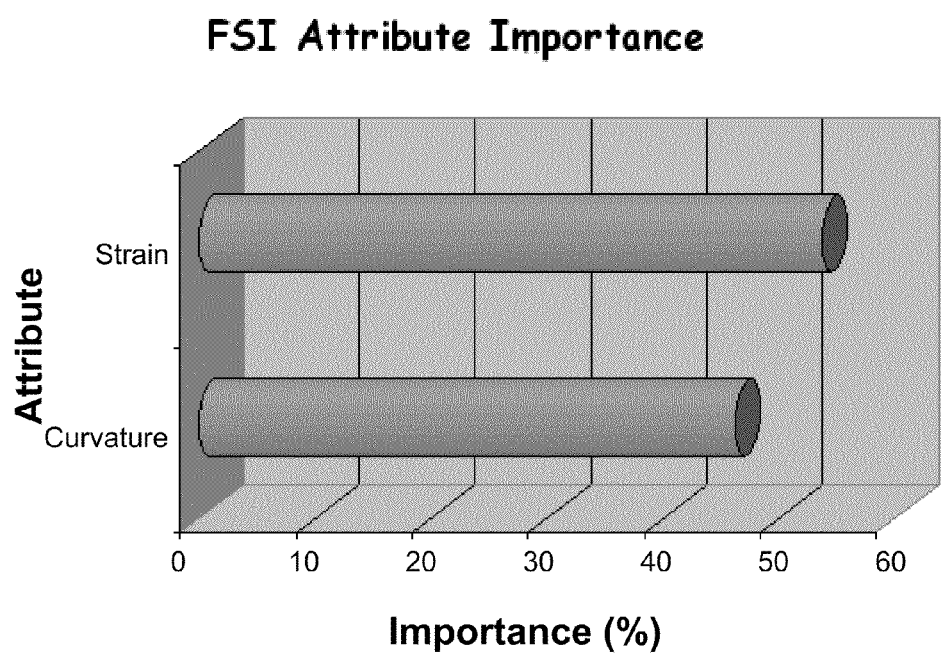
FIG. 6: The relative importance of the curvature and strain attributes in predicting the unknown FSI target variable.
Figure 11:
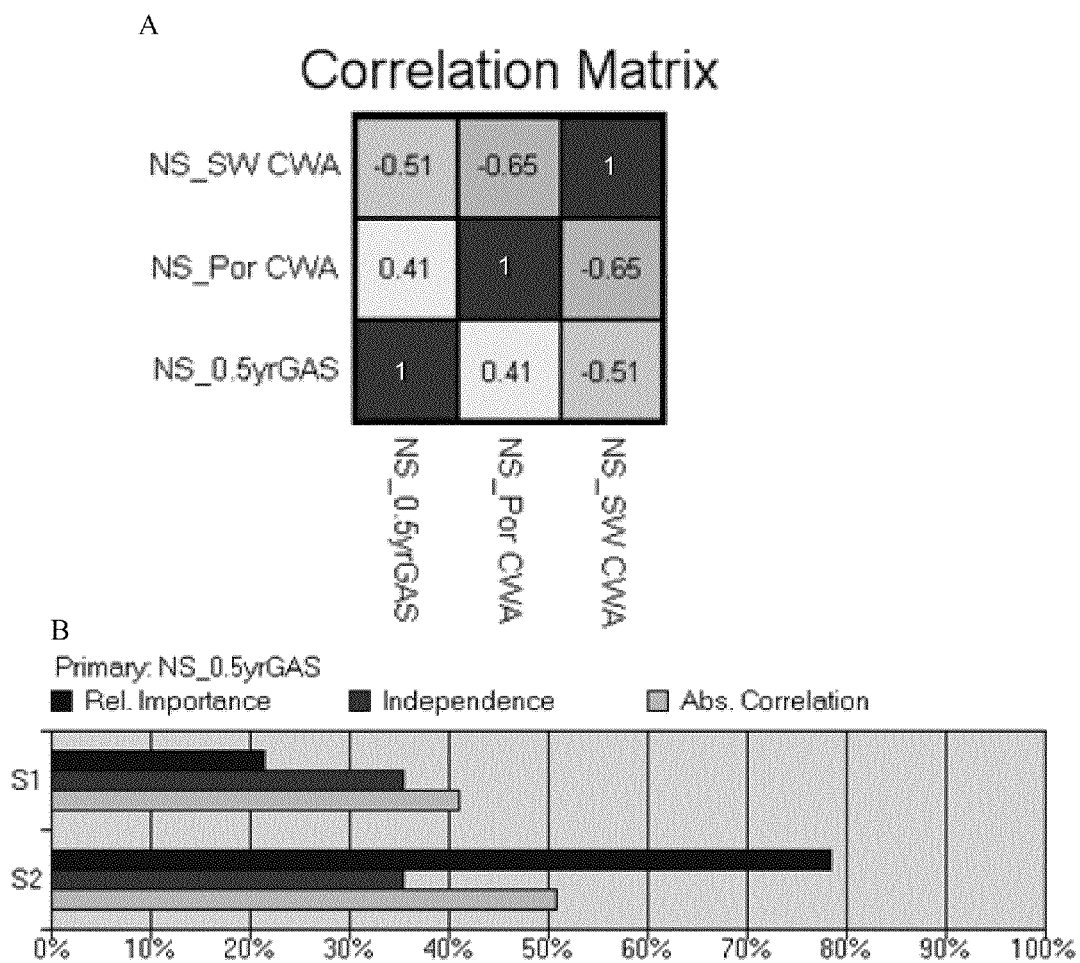
FIG. 11: Correlation matrix (A) and importance summary (B) for the petrophysical attributes (S1=Por CWA; S2=SW CWA) calibrated to gas production.

FIG. 5 is a representation of an uncertainty that has been reduced. FIG. 6 shows the calculated importance of the strain and curvature attributes. Strain contributes 54% of the uncertainty reduction while curvature contributes 46%. This is being driven primarily by the higher strain correlation of 0.68 versus the 0.57 for curvature since the attributes are fairly independent with a redundancy correlation of 0.11.

By using the described AIM factors, the strain and curvature in a subterranean formation is identified, areas of greater flow are identified and production can be increased. Because these attributes are assigned to the subterranean image, they can be used to identify areas of high hydrocarbon flow, locations of formation connectivity, and identify the optimum location to retrieve hydrocarbons from a subterranean formation.

EXAMPLE 2

Multivariate Analysis in Tight Gas

This study considers two primary variables in a tight gas field. The first is cumulative gas production taken at 182 days and the second is a corrected 182-day cumulative water production variable. Cumulative gas production has been normalized to correct for depth differences and curtailment issues; the cumulative gas production at 182 days has been divided by the difference between the square of a well's initial pressure and the square of its average flowing well pressure over 182 days. Cumulative water production has been similarly normalized to correct for depth differences and curtailment issues, however, the cumulative water production value is first adjusted to account for fluid injected during the completion process. In order to account for completion fluid, the cumulative water production at 182 days has been reduced by subtracting the volume of the load fluid injected. FIG. 7 shows a histogram of the gas production variable. FIG. 8 displays a histogram of the water production variable. The study shows a total of 34 182-day gas production values with a mean of 5.31 scf/psi2 and a total of 34 182-day water production values with a mean of −12.78 bbls/psi2. The black line is the location of the 3D seismic.

The inventory of attributes includes 16 geometric attributes, 33 geomechanical attributes (12 elastic dislocation, 13 FEM, 8 pore pressure and fracture gradient), 18 sedimentary attributes (sand thickness frequency), 50 petrophysical attributes, and 22 geophysical attributes for a total of 139 different attributes. Table 2 shows list the attribute inventory. Describing each attribute will not be done here; only the description for the most important attributes as determined in the next phase of work will be given. Descriptions are given within the context of why and how they are allowed to influence the primaries that are predicted in the final phase of work.

TABLE 2

Attribute Inventory

| Geometric (16) | Geomechanical (33) | Sedimentary (18) | Petrophysical (50) | Geophysical (22) |
| --- | --- | --- | --- | --- |
| Topography | MS BotLWF | SthkCt05 LMWF | NetThk CWA | AVOgrad BK |
| Z TWF | MS BK | SthkCt05 LWF | NetThk LWF | AVOgrad MarkD |
| Z cmfs20 | MS TopMWF | SthkCt05 MWF | NetThk MWF | AVOgrad MarkD-E |
| Z BK | MTS BotLWF | SthkCt10 LMWF | NetThk UWF | AVOgrad MarkE-F |
| Z cmfs10 | MTS BK | SthkCt10 LWF | NetThk CC | COH MarkD |
| Z Rollins | MTS TopMWF | SthkCt10 MWF | N/G CWA | COH MarkD-E |

TABLE 2-continued

Attribute Inventory

| Geometric (16) | Geomechanical (33) | Sedimentary (18) | Petrophysical (50) | Geophysical (22) |
|---|---|---|---|---|
| Thk 08 | DS BotLWF | SthkCt20 LMWF | N/G LWF | COH MarkE-F |
| Thk WF | DS BK | SthkCt20 LWF | N/G MWF | Layer BK |
| Thk UWF | DS TopMWF | SthkCt20 MWF | N/G UWF | Layer MarkD |
| Thk MWF | MCSS BotLWF | SthkCt40 LMWF | N/G CC | Layer MarkD-E |
| Thk LWF | MCSS BK | SthkCt40 LWF | Por CWA | Layer MarkE-F |
| Thk CC | MCSS TopMWF | SthkCt40 MWF | Por LWF | ANISOwell BK |
| FD All | DisplTotal | SthkCt05-20 LMWF | Por MWF | ANISOwell MarkD |
| FD 01 | DisplU1 | SthkCt05-20 LWF | Por UWF | ANISOwell MarkD-E |
| FD 02 | DisplU2 | SthkCt05-20 MWF | Por CC | ANISO well MarkE-F |
| FD 03 | DisplU3 | SthkCt10-40 LMWF | SW CWA | CURV vol MarkD |
|  | StressMax | SthkCt10-40 LWF | SW LWF | CURV vol MarkD-E |
|  | StressMid | SthkCt10-40 MWF | SW MWF | CURV vol MarkE-F |
|  | StressMin |  | SW UWF | CCThk |
|  | Stress11 |  | SW CC | CCD |
|  | Stress22 |  | movW CWA | CCthinsThk |
|  | Stress33 |  | movW LWF |  |
|  | Stress12 |  | movW MWF |  |
|  | Stress13 |  | movW UWF |  |
|  | Stress23 |  | movW CC |  |
|  | PP CC |  | Vsh CWA |  |
|  | PPG CC |  | Vsh LWF |  |
|  | PP LWF |  | Vsh MWF |  |
|  | PPG LWF |  | Vsh UWF |  |
|  | PP MWF |  | Vsh CC |  |
|  | PPG MWF |  | PorThk UWF |  |
|  | PP UWF |  | PorThk CWA |  |
|  | PPG UWF |  | PorThk LWF |  |
|  |  |  | PorThk MWF |  |
|  |  |  | PorThk CC |  |
|  |  |  | GasThk CWA |  |
|  |  |  | GasThk LWF |  |
|  |  |  | GasThk MWF |  |
|  |  |  | GasThk UWF |  |
|  |  |  | GasThk CC |  |
|  |  |  | movWThk CWA |  |
|  |  |  | movWThk LWF |  |
|  |  |  | movWThk MWF |  |
|  |  |  | movWThk UWF |  |
|  |  |  | movWThk CC |  |
|  |  |  | shThk CWA |  |
|  |  |  | shThk LWF |  |
|  |  |  | shThk MWF |  |
|  |  |  | shThk UWF |  |
|  |  |  | shThk CC |  |

Many attributes are created from the same variable measured over a different interval. For example, each petrophysical variable such as net thickness is available from the Coal (CC), Lower Water Front (LWF), Middle Water Front (MWF), and Upper Water Front (UWF) intervals as well as over the entire Water Front interval. The five net thickness attributes are completion-weighted averages from each interval, that is, only net thickness within the completion intervals is counted toward the average for each respective attribute. A similar situation exists for the sand thickness frequency, elastic dislocation, pore pressure and fracture gradient, and geophysical attributes.

Other attributes, such as the petrophysical attributes, are available only at the well locations while the remaining attributes are available everywhere. If one or more of the petrophysical attributes is used for prediction, there needs to be an intermediate step to interpolate these prior to the updating and prediction. In anticipation of interpolation, highly interpretive sedimentology maps are created to help guide the interpolation of petrophysical properties. Additionally, attributes are derived at different scales and possess different levels of quality. The geophysical attributes, for example, represent larger scales and lower quality. However, these concepts of scale and quality are irrelevant for geometric attributes such as the depth of surfaces or distance from fault. Accommodations may be made within the multivariate model to account for varying scale and quality. Although some or many of the attributes are redundant, a majority of the redundancies are removed and the model does not allow two or more redundant attributes to influence prediction significantly. Like the primary 182-day cumulative gas and water production variables, all 139 attributes are uploaded into an existing 2D model created previously.

In order to reduce the inventory of 139 attributes down to a handful of the most influential attributes that control the spatial behavior of the primary 182-day cumulative gas and water production variables. This helps guide the acquisition of subsurface data toward collecting the most relevant information for discriminating between higher and lower values of the key primary variables. It allows analysis of previously acquired data toward generating the most influential reservoir description products and attributes for discriminating between higher and lower values of the key primary variables. Narrowing the number of relevant attributes helps predict the value of key primary variables between well locations to identify high potential drilling (sweet-spot) locations. Attributes identified here guide data acquisition, analysis, and prediction for especially immature reservoir or reservoir opportunities where few wells have been drilled, assuming the immature site can reasonably be called an analog to where the calibration was derived.

These utilities can be realized because the influential attributes are tied together quantitatively with the primary variables in a multivariate model. The key parameter in this parametric model is correlation. Correlations are derived from collocated attribute-primary and attribute-attribute pairs of data and represented in a correlation matrix.

The importance or influence of each attribute can then be derived from the correlation matrix. Attribute importance is a statistical balance between correlation to the primary and redundancy, which is correlation with the other attributes. An influential attribute is highly correlated to the primary but uncorrelated to the rest of the attributes being considered, or independent of the other attributes. Less influential attributes have low correlation with the primary, are redundant with the other attributes, or both.

Statistical importance must then be weighed against geological reality; that is, some attributes will be statistically important, but geologically inconsistent or non-sensible. A geologically inconsistent attribute has a correlation coefficient that suggests and runs counter to a well-understood and accepted geological hypothesis. For example, it may be well understood and evidentially supported that more brittle reservoir rock results in higher gas production. But given the collocated and paired data available, if the correlation between brittleness and gas production is negative, this working hypothesis needs to be revisited or revised, or this attribute should be filtered out of the final multivariate correlation model.

Eventually a handful of statistically influential and geologically substantiated attributes are chosen for parameterization in a final multivariate model. These correlations and their implied geological influences make up the model in which we can interrogate for the drivers of the high gas production sweet spots. This process can also be used to predict sweet spots beyond the wells. Determining the most influential attributes cannot be achieved in a single step as a 141×141 matrix (two primaries+139 attributes) cannot be generated. The strategy is to first remove redundancies quickly within the geometric, geomechanical, sedimentary, petrophysical, and geophysical groups and visualize importance. Then these can be brought together across groups to look for obvious redundancies and visualize importance. Eventually a handful is selected for parameterization in the multivariate model.

FIG. 8 shows the final correlation matrix and importance summary for the calibration of geometric attributes to the gas production primary variable. These are the attributes left after screening out those that are either statistically unimportant or geologically non-sensible. There are 5 out of 16 geometric attributes that meet this criterion including topography, top elevation (Z), overburden thickness (Thk OB), Water Front thickness (Thk WF), and distance from a fault (FD ALL).

Topography, top elevation, overburden thickness, formation thickness for WF, are all influenced by the thickness of the overburden and properties of the formation underneath. In the North field area, an increase in surface elevation correlates to a general increase in overburden thickness where wells are located at higher elevations. The increased overburden thickness contributes to a change in stress state and stress state effects on fractures, which is important to gas production. Increased overburden thickness may correlate to gas production because increased overburden thickness contributes to a change in stress state. In the North field area the change in stress state promotes slippage along natural fractures of particular orientations, which leads to enhanced system permeabilities when and where the stress state promotes slippage of existing natural fractures. The correlation of the WF thickness with overburden thickness appears to be a coincidental correlation with the overburden thickness having more influence on gas production than WF thickness. The distance from faults involves several properties of the formation including increased tensile stress near the faults as well as possible fractures into sands allowing gas to escape. Additionally the center of the formation is fractured and the northern part of the formation, farther from the fractures, may simply produce more gas.

FIGS. 8 A & B shows calibration of water production to just one attribute, Thk WF=thickness of the Water Front, has a statistically significant correlation. Because the Water Front section thickens to the north away from the faults, it is likely the increased water production for thinner Water Front is related to faulting rather than the Water Front section thickness. Maximum tensile stress in the faulted areas contributes to the formation of joints that may have compromised seals for some of the individually trapped sand bodies, resulting in higher water production from the multiple sands in the completed intervals.

FIGS. 8 C & D displays two significant attributes for gas production from elastic dislocation (ED). ED attributes, maximum tensile stress (MTS TopMWF) and differential stress (DS TopMWF) at the top of Water Front represent stress perturbations that arose at the time of faulting (paleostresses) due to slip on seismically interpreted faults. As such, they are most useful in considering off-fault damage within the near-fault area. A positive correlation between the maximum tensile (most negative) stress and gas production would indicate that as the predicted paleo-tensile-stress becomes lesser or more positive in an area, gas production increases. Tensile stress is an indicator for the formation of joints (opening-mode fractures). Increasing tensile stress indicates a greater intensity of jointing. An explanation for the calculated positive correlation would therefore be that the joints formed during faulting allowed gas to leak out of the system. Areas associated with lesser maximum tensile stress would be those areas with fewer joints and more preserved gas in place. Differential top stress, like maximum tensile stress, supports the idea that within the near-fault area, the formation of fractures and enhanced permeability allowed gas to leak out of the system during or soon after the faulting event. Differential stress can be used to predict the formation of new fractures or the reactivation of pre-existing heterogeneities. In either case, greater differential stress should correlate with greater permeability. We can therefore justify the negative correlation between differential stress and gas production by suggesting that the enhanced permeability at the time of faulting allowed early leak-off of the gas. Thus, today, less gas is produced in areas of greater predicted paleo-differential stress than areas of lesser predicted paleo-differential stress.

ED attributes that contribute to water production (FIGS. 10 A & B) include maximum tensile stress (MTS TopMWF) and differential stress (DS TopMWF) at the top Water Front surface elevations. The negative correlation between maximum tensile (most negative) stress and water production indicates that as the predicted paleo-tensile stress becomes greater or more negative, water production increases. This condition is similar to the case of the gas production correlation above. Areas of greater maximum tensile stress (MTS) experienced a greater intensity of jointing and thus enhanced permeability, which allowed gas to leak out of the system. The gas was replaced by water, and the high permeability of the jointed rock now allows water to be produced at much higher rates than elsewhere in the field. The positive correlation between predicted paleo-differential-stress and water production is consistent with all of the justifications above. As permeability was enhanced in areas of greater differential stress, gas leaked out of the system and was replaced by water. Thus, today, water production is greatest in areas of greatest predicted paleo-differential stress.

Geomechanical attributes that contributed to gas production (FIGS. 10 C & D) were total displacement (DisplTotal) and absolute value of differential stress both east-west versus north-south (S22-S11) and east-west versus depth (S22-S33). The positive correlation suggests that as total displacement increases, gas production increases. Total displacement is the displacement due to shear, extensional, and contractional strains within the medium that arise in response to a given stress condition. Because the Water Front formation consists of tight sandstone, it will not support much contractional deformation such as pore collapse. In this case, total displacement is dominantly a function of shear and extensional movement in the medium. These types of deformation are expected to increase the reservoir permeability and correlate with higher fluid production. While the positive correlation with absolute differential stress suggests that as strike-slip shearing potential increases, gas production increases. S22-S11 is the differential stress between the E-W and N-S stress components. In the reservoir interval, these are $SH_{max}$ and $Sh_{min}$. As indicated by the FEM modeling, most of the Water Front reservoir in the Tight Gas Basin is in a strike slip-normal faulting regime ($SH_{max} \sim Sv > Sh_{min}$). Greater differential stress $SH_{max} - Sh_{min}$ (S22-S11) suggests that a larger number of fractures with dip angle >70°, striking ~E-W, which includes a majority of fractures interpreted from available image data, may be shearing under the current-day stress conditions. Therefore, greater fluid production would be expected in areas of greater differential stress. S22-S33 is the differential stress between the N-S and vertical stress components, or Sv and $Sh_{min}$. As this difference increases, the stress style changes from being within the strike-slip domain into a more transitional strike-slip to normal faulting domain where $SH_{max} \sim Sv$. In this setting, fractures with dip angles >50° can be reactivated. Thus, the transitional environment allows for a greater population of the existing fractures to be reactivated. Therefore, as S22-S33 increases, reservoir permeability should increase, leading to greater fluid production. No statistically and geologically significant geomechanical (FEM) attributes were found for calibration to water production. Other geomechanical attributes and sedimentary attributes did not provide a significant correlation with gas or water production in the Water Front formation including pore pressure, fracture gradient, sand thickness frequency among others that may be very influential in other formations.

Petrophysical attributes that contributed to gas production include porosity average (Por CWA) and water saturation average (SW CWA). It is expected that porosity average would correspond with increased gas production. High gas production correlating to low water saturations is intuitively obvious. A review of the correlation of gas production to average water saturation for specific intervals reveals Middle and Upper Water Front water saturations have the highest correlation values; indicating that, where trapped, these sands provide a significant uplift to gas production. No statistically and geologically significant petrophysical attributes were found for water production. No geophysical attributes show significant correlation to either water or gas production.

The by-group of statistically and geologically meaningful attributes are now considered across groups. Although less common than within groups, there can be cross-group redundancies, relatively insignificant attributes, or other attributes that may be removed in this last step toward a robust final multivariate model.

Figure 12:
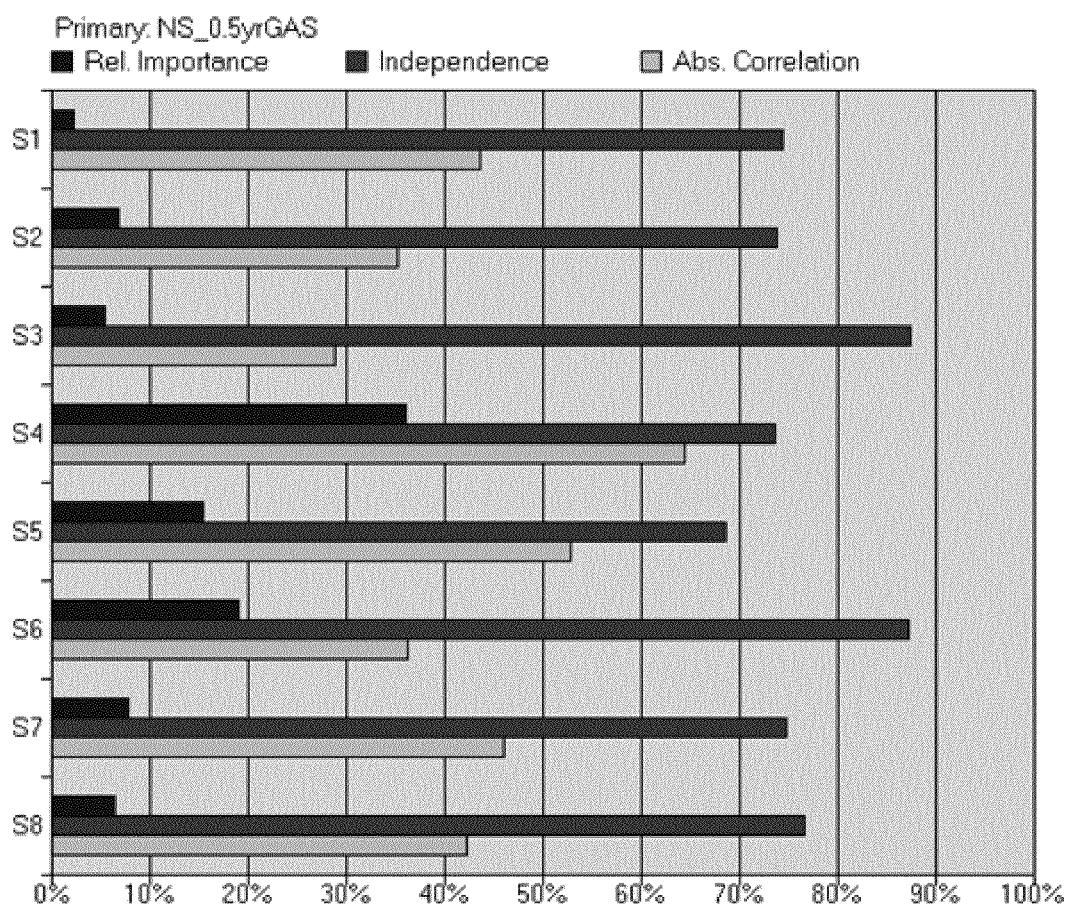
FIG. 12: (A) Final correlation matrix for all important attributes to gas production (Thk OB, MTS TopMWF, DS TopMWF, S22-S11, S22-S33, DisplTotal, Por CWA, and SW CWA) calibrated to gas production. (B) Final importance summary (S1=Thk OB; S2=MTS TopMWF; S3=DS TopMWF; S4=S22-S11; S5=S22-S33; S6=DisplTotal; S7=Por CWA; S8=SW CWA) calibrated to gas production.
Figure 13:
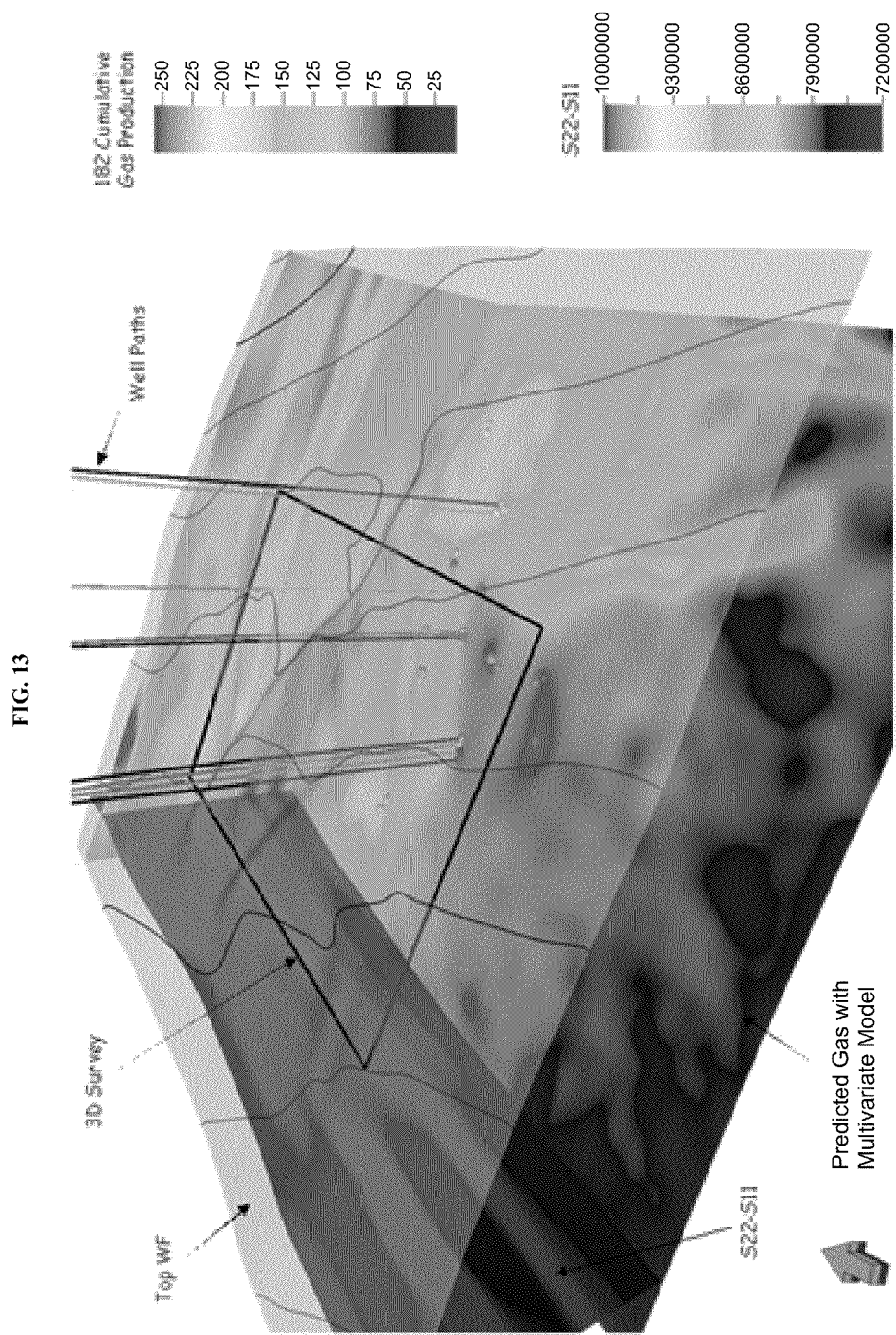
FIG. 13: Predicted gas production using the final multivariate model.
Figure 14:
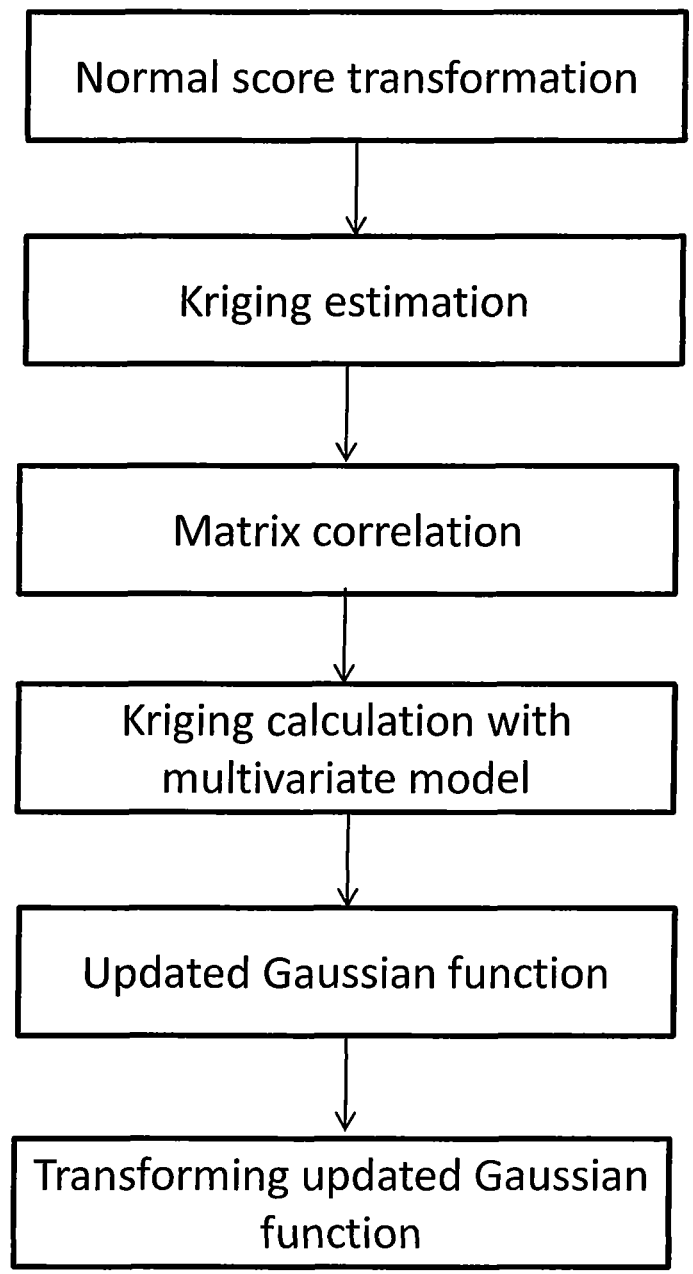
FIG. 14: Flowchart of the claimed method.

The final multivariate model contains a total of eight influential (statistically and geologically meaningful) attributes. FIG. 12 shows the corresponding correlation matrix and summary of importance for this model. Attributes identified n order from most to least influential include S22-S11 (36%), S22-S33 (19%), DisplTotal (15%), Por CWA (8%), MTS TopMWF (7%), SW CWA (7%), DS TopMWF (5%), Thk OB (3%), The percent represents the amount of influence each attribute exhibits towards explaining the gas production heterogeneity we see today and that to which we will predict beyond the wells in the next phase involving prediction. One important measure this particular model possesses is an effective correlation coefficient of 0.87 (square root of likelihood variance). That is, although the correlation coefficient of individual attributes to gas production is on average 0.48, combining the attributes in this way results in a correlation of 0.87. A water saturation multivariate model is not built. Although three attributes were highlighted in the by-group analysis, they were done so in corollary to gas production and thought not to bring independent insight into what is really driving water production.

The last phase of work is executing the multivariate model parameterized as in FIG. 11-13 and FIG. 11-14 for the prediction of gas production. As FIG. 11-1 explains, predictions are a combination of a prior estimation of the primary variable independent of the attribute information, called the prior, and a likelihood estimation of the primary variable according to the multivariate correlation with the attribute information. The prior estimates of the primary gas production variable are not shown. This map shows a relatively short range of spatial correlation quantified through variography and quickly returns to a constant mean equal to the average gas production beyond well control. Prediction at locations increasingly further away from well control is increasingly reliant on likelihood, which is a combination of the attributes according to the model derived in the previous section. The predicted map of gas production is shown in FIG. 11-15, the Coal level. The transparent top surface with coarse contour interval is the top of the Water Front. The gas production points are shown with a few of the corresponding wells paths. The fence cross sections show the most important attribute, S22-S11.

Attribute correlation to gas production is dominated by the geomechanical modeling values extracted from finite element and elastic dislocation modeling; the geomechanical values account for 82% of overall influence. This work strongly indicates the conditions required for critically stressed fractures are important to gas production in the North field area. While the geometric attribute of overburden thickness accounts for only 3% of influence, it is an important component contributing to the stress state driving the geomechanical modeling results. The 15% influence of the petrophysical attributes reinforces the need to target better reservoir-quality sands where they can best be charged and trapped. Correlating attributes to gas production has proven to be much more predictive than correlating attributes to water production. This is presumed to be a result of the brief production history (182-day) values used for this study. Significant volumes of water pumped into the wells during hydraulic fracturing treatments require some time to be recovered in production; many of these wells have not been produced long enough to recover the completion fluids. It is possible a multivariate analysis of these attributes may be predictive of water production after a sufficient time for production of fluids has elapsed.

Although the systems and processes described herein have been described in detail, it should be understood that various changes, substitutions, and alterations can be made without departing from the spirit and scope of the invention as defined by the following claims. Each and every claim is incorporated into the specification as an embodiment of the present invention. Thus, the claims are part of the description and should be deemed to be additional description to the preferred embodiments of the present invention.

REFERENCES

All of the references cited herein are expressly incorporated by reference. The discussion of any reference is not an admission that it is prior art to the present invention, especially any reference that may have a publication date after the priority date of this application. Incorporated references are listed again here for convenience:

1. U.S. Pat. No. 5,539,704, "Bayesian Sequential sequential Gaussian Simulation of Litho logy simulation of litho logy with Non-Linear Data, non-linear data," Western Atlas Int., Doyen & Den Boer, (1996).
2. U.S. Pat. No. 5,764,515, "Method for predicting, by means of an inversion technique, the evolution of the production of an underground reservoir," Inst Francois Du Petrol, Guerillot & Roggero (1998).
3. U.S. Pat. No. 6,662,109, "Method of constraining by dynamic production data a fine model representative of the distribution in the reservoir of a physical quantity characteristic of the subsoil structure," Inst Francois Du Petrol, Roggero & Mezghani (2003).
4. U.S. Pat. No. 6,950,786, "Method and apparatus for generating a cross plot in attribute space from a plurality of attribute data sets and generating a class data set from the cross plot," Schlumberger Technology, Sonneland & Gehrmann (2008).
5. U.S. Pat. No. 7,363,163 "Method for updating a geological reservoir model by means of dynamic data" Inst Francois Du Petrol, Mickaele, et al., (2008)
6. U.S. Pat. No. 7,392,166, "Method for more rapidly producing the representative stochastic model of a heterogeneous underground reservoir defined by uncertain static and dynamic data," Inst Francois Du Petrol, Le Ravalec-Dupin & Roggero (2006).
7. U.S. Pat. No. 7,400,978, US2007156341, "Method for Updating a Geologic Model by Seismic Data," Inst Francois Du Petrol, Langlais, et al., (2007).
8. U.S. Pat. No. 7,463,027 "Systems and methods for NMR logging" Halliburton Energy Services, Prammer, et al., (2008).
9. US20070005253 "Method for updating a geologic model by seismic and production data" Inst Francois Du Petrol, Formel, et al., (2007).
10. US2007203681, WO2007100827, "Monte Carlo simulation of well logging data," Saudi Arabian Oil Co., Al-Waheed, et al. (2007).
11. US20080133192, WO2008070286, "Method And Apparatus For Geomodel Uplayering," ConocoPhillips Co., Gallagher, (2008).
12. Barr, et al., "Pre-Development Fracture Modeling in the Clair Field, West of Shetland," ed. Lonergan, et al., *Fractured Reservoirs*, Geological Society of London Special Publication, 270:205-25 (2007).
13. Barton, et al., "Fluid Flow along Potentially Active Faults in Crystalline Rock," Geology, 23:683-6 (1995).
14. Bishop, *Neural Networks for Pattern Recognition*, Oxford University Press, New York (1995).
15. Bourne & Willemse, "Elastic Stress Control on the Pattern of Tensile Fracturing around a Small Fault Network at Nash Point," UK: J. Struct. Geol. 23:1753-70 (2001).
16. Decker, et al., "The use of Remote Sensing, Curvature Analysis, and Coal Petrology as Indicators of Higher Coal Reservoir Permeability" International Coalbed Methane Symposium Proceedings, p. 325-40 (1989).
17. Deutsch and Journel, *GSLIB—Geostatistical Software Library and User Guide*, Oxford University Press, 2nd Edition (1998).
18. Deutsch and Zanon, "Direct Prediction of Reservoir Performance with Bayesian Updating under a Multivariate Gaussian Model," Canadian International Petroleum Conference, Paper 047 (2004).
19. Deutsch, et al., "Joint Uncertainty Assessment with a Combined Bayesian Updating/Lu/P-Field Approach," IAMG, 01:639-44 (2005).
20. Deutsch, "What in the Reservoir is Geostatistics Good for?" JCPT 45:14-20 (2006).
21. Doyen, et al., "Seismic Porosity Mapping in the Ekofisk Field using a New Form of Collocated Cokriging:," SPE 36498 (1996).
22. Endres, et al., Quantitative Fracture Prediction from Seismic Data," Petroleum Geoscience, 14:369-77 (2008).
23. Ericsson, et al., "Facies and Curvature Controlled 3D Fracture Models in a Cretaceous Carbonate Reservoir, Arabian Gulf," in: Jones, et al. eds., *Faulting, Fault Sealing, and Fluid Flow in Hydrocarbon Reservoirs* GSL Special Publication, 147:299-312 (1998).
24. Fischer and Wilkerson, Predicting the Orientation of Joints from Fold Shape: Results of Pseudo-Three-Dimensional Modeling and Curvature Analysis," Geology, 28:15-8 (2000).
25. Gale, "Assessing the Permeability Characteristics of Fractured Rock," in Narasimhan, *Recent Trends in Hydrogeology* GSA Special Paper 189:163-81 (1982).
26. Gale, et al., "Natural Fractures in the Barnett Shale and their Importance for Hydraulic Fracture Treatments," AAPG Bulletin, 91:603-22 (2007).
27. Haller and Porturas, "How to Characterize Fractures in Reservoirs using Borehole and Core Images; Case Studies," in Harvey and Lovell, eds., *Core-Log Integration*, GSA Special Publication, 136:249-59 (1998).
28. Healy, et al., "Fracture Prediction for the 1980 El Asnam, Algeria Reservoir using Elastic Dislocation Modeling," Tectonics, 23: TC6005 (2004).
29. Hennings, et al., "Combining Outcrop Data and Three-Dimensional Models to Characterize Fractured Reservoirs: An Example from Wyoming," AAPG Bulletin, 84:830-849 (2000).
30. Hodges and Lehmann, *Basic Concepts of Probability and Statistics*, SIAM, New York (2004).
31. Journel and Huijbregts, *Mining Geostatistics*, Academic Press, New York (1978).
32. Kattenhorn, et al., "Joints at High Angles to Normal Fault Strike: An Explanation using 3-D Numerical Models of Fault-Perturbed Stress Fields," J. Struct. Geol., 22:1-23 (2000).
33. Lisle, "Detecting Zones of Abnormal Strains in Structures Using Gaussian Curvature Analysis," AAPG Bulletin, 78:1811-9 (1994).
34. Lohr, et al., "Prediction of Subseismic Faults and Fractures: Integration of Three Dimensional Retrodeformation and Well Data on an Example of Deformation around an Inverted Fault," AAPG Bulletin, 92:473-485 (2008).

35. Lynn, et al., "Correlation between P-Wave AVOA and S-Wave Travel Time Anisotropy in a Naturally Fractured Gas Reservoir," The Leading Edge, 15:931-5 (1996).
36. Mallick, et al., "Determination of the Principal Directions of Azimuthal Anisotropy from P-Wave Seismic Data," Geophysics, 63:692-706 (1998).
37. Murray, "Quantitative Fracture Study; Sanish Pool, McKenzie County, N. Dak.," AAPG Bulletin, 52:57-65 (1968).
38. National Research Council, *Rock Fractures and Fluid Flow*, (1996).
39. Nelson, Geological Analysis of Naturally Fractured Reservoirs, (2001).
40. Ortiz, "Short Note: Naïve Bayes Classifiers and Permanence of Ratios," CGG Report 4 (2002).
41. Sanders, et al., "Kinematic Structural Restorations and Discrete Fracture Modeling of a Thrust Trap; a Case Study from the Tarija Basin, Argentina," Mar. Pet. Geo., 21:845-55 (2004).
42. Schultz-Ela and Yeh, "Predicting Fracture Permeability from Bed Curvature," Proc. 33rd U.S. Symp. Rock Mech., 33:9-89 (1992).
43. Stearns and Friedman, "Reservoirs in Fractured Rock," in *Stratigraphic Oil and Gas Fields: Classification, Exploration Methods, and Case Histories*, ed. King, AAPG Memoir, 16:82-106 (1972).
44. Trappe and Hellmich, "Seismic Volume Attributes for Fracture Analysis," in *Fracture and In-Situ Characterization of Hydrocarbon Reservoirs*, ed. Ameen, GSL Special Publication, 209:65-75 (2003).
45. Warpinkski and Lorenz, "Analysis of the Multiwall Experiment Data and Results: Implications for the Basin-Centered Gas Model," in *Understanding, Exploring and Developing Tight-Gas Sands*, eds. Cumella, et al., AAPG Hedberg Series, 3:157-76 (2008).
46. Wilkins, 2007, Fracture Intensity from Geomechanical Models: Application to the Blue Forest 3D Survey, Green River Basin, Wyoming, USA: Geological Society, London, Special Publication, v. 292; p. 137-157.
47. Willis, et al., "Spatial Orientation and Distribution of Reservoir Fractures from Scattered Seismic Energy," Geophysics, 71:O43-51 (2006).
48. Wong and Boerner, "Quantifying Uncertainty for Mapping Fracture Intensity: An Improved Workflow,". First Break, 22:41-7 (2004).
49. Xu, et al., "Integration Seismic Data in Reservoir Modeling: The Collocated Cokriging Alternative," Soc. Petro. Eng., Paper 24742 (1992).

The invention claimed is:
1. A method comprising:
 a) making a multivariate Gaussian assumption with a normal score transformation for any events within a subsurface formation;
 b) executing a simple kriging to estimate a prior likelihood mean ($y_{SK}$) and variance ($\delta_{SK}^2$) for the events;
 c) calculating, by a processor, a matrix of correlation coefficients ($\rho_n$) from all collocated combinations of normal scored event pairs;
 d) executing a simple kriging ($\lambda_n$) with a calculated model of multivariate correlation to estimate a likelihood mean ($y_L$) and variance ($\delta_L^2$);
 e) calculating an updated Gaussian Probability Distribution Function (PDF) by combining the prior and likelihood estimates according to the normal score transformation (a);
 f) transforming the updated Gaussian PDF $N(y_U, \delta_U^2)$ back to real units using the normal score transformation (a);
 g) calculating one or more attribute importance ($I_n$) using equation

$$I_n = \frac{\lambda_n \cdot \rho_n}{\sum_{n=1}^{N} \lambda_n \cdot \rho_n}, n = 1, \ldots N;$$

and
 h) obtaining formation measurements for attributes with an attribute importance (I) over exceedance probability of 50% to parameterize a final multivariate model that predicts porosity, permeability, water saturation, or net thickness.
2. The method of claim 1, wherein the real units are one or more attributes selected from the group consisting of geometric, geomechanical, sedimentary, petrophysical, geophysical, and other geomechanical modeling values.
3. The method of claim 1, wherein the real units are one or more attributes selected from the group consisting of topography, surface elevation, top elevation, overburden thickness, formation thickness, distance to faults, tensile stress, maximum tensile stress, differential stress, total displacement, absolute differential stress, pore pressure, fracture gradient, sand thickness frequency, porosity, porosity average, water saturation, and any combinations thereof.
4. A method comprising:
 a) making a multivariate Gaussian assumption with a normal score transformation for any events within a subsurface formation;
 b) executing a simple kriging to estimate a prior likelihood mean ($y_{SK}$) and variance ($\delta_{SK}^2$) for the events;
 c) calculating, by a processor, a matrix of correlation coefficients ($\rho_n$) from all collocated combinations of normal scored event pairs;
 d) executing a simple kriging ($\lambda_n$) with a calculated model of multivariate correlation to estimate a likelihood mean ($y_L$) and variance ($\delta_L^2$);
 e) calculating an updated Gaussian Probability Distribution Function (PDF) by combining the prior and likelihood estimates according to the normal score transformation (a);
 f) transforming the updated Gaussian PDF $N(y_U, \delta_U^2)$ back to real units using the normal score transformation (a);
 g) calculating one or more attribute importance ($I_n$) using equation $$I_n = \frac{\lambda_n \cdot \rho_n}{\sum_{n=1}^{N} \lambda_n \cdot \rho_n}, n = 1, \ldots N;$$

and
 h) obtaining formation measurements for attributes with an attribute importance (I) over exceedance probability of 10% to parameterize a final multivariate model that predicts porosity, permeability, water saturation, or net thickness.
5. A method comprising:
 a) making a multivariate Gaussian assumption with a normal score transformation for any events within a subsurface formation;
 b) executing a simple kriging to estimate a prior likelihood mean ($y_{SK}$) and variance ($\delta_{SK}^2$) for the events;

c) calculating, by a processor, a matrix of correlation coefficients ($\rho_n$) from all collocated combinations of normal scored event pairs;
d) executing a simple kriging ($\lambda_n$) with a calculated model of multivariate correlation to estimate a likelihood mean ($y_L$) and variance ($\delta_L^2$);
e) calculating an updated Gaussian Probability Distribution Function (PDF) by combining the prior and likelihood estimates according to the normal score transformation (a);
f) transforming the updated Gaussian PDF $N(y_U, \delta_U^2)$ back to real units using the normal score transformation (a);
g) calculating one or more attribute importance ($I_n$) using equation $$I_n = \frac{\lambda_n \cdot \rho_n}{\sum_{n=1}^{N} \lambda_n \cdot \rho_n}, n = 1, \ldots N;$$

and
h) obtaining formation measurements for attributes with an attribute importance (I) over exceedance probability of 90% to parameterize a final multivariate model that predicts porosity, permeability, water saturation, or net thickness.

* * * * *